United States Patent
Chen

(10) Patent No.: US 11,520,028 B2
(45) Date of Patent: Dec. 6, 2022

(54) OCCUPANCY DETECTION USING MULTIPLE ANTENNA MOTION SENSING

(71) Applicant: Richwave Technology Corp., Taipei (TW)

(72) Inventor: Tse-Peng Chen, Taipei (TW)

(73) Assignee: RichWave Technology Corp., Taipei (TW)

( * ) Notice: Subject to any disclaimer, the term of this patent is extended or adjusted under 35 U.S.C. 154(b) by 298 days.

(21) Appl. No.: 16/210,227

(22) Filed: Dec. 5, 2018

(65) Prior Publication Data

US 2019/0215930 A1 Jul. 11, 2019

Related U.S. Application Data

(60) Provisional application No. 62/615,896, filed on Jan. 10, 2018.

(51) Int. Cl.
| | | |
|---|---|---|
| *G01S 13/04* | (2006.01) | |
| *F21V 23/04* | (2006.01) | |
| *G01S 13/56* | (2006.01) | |
| *H05B 47/19* | (2020.01) | |
| *H05B 47/115* | (2020.01) | |

(52) U.S. Cl.
CPC .......... *G01S 13/04* (2013.01); *F21V 23/0471* (2013.01); *G01S 13/56* (2013.01); *H05B 47/115* (2020.01); *H05B 47/19* (2020.01)

(58) Field of Classification Search
CPC ... H05B 47/105; H05B 47/19; F21V 23/0471; G01S 13/04; G01S 13/56
USPC .......................................................... 342/82
See application file for complete search history.

(56) References Cited

U.S. PATENT DOCUMENTS

| | | | | |
|---|---|---|---|---|
| 4,458,219 A | * | 7/1984 | Vorhaus .................. | H01P 1/184 333/164 |
| 4,502,027 A | * | 2/1985 | Ayasli ....................... | H01P 1/15 725/128 |
| 5,170,162 A | * | 12/1992 | Fredericks ............. | G08G 1/056 342/69 |

(Continued)

FOREIGN PATENT DOCUMENTS

| | | | | |
|---|---|---|---|---|
| DE | 102005049772 A1 | * | 4/2007 | ........... G01S 13/422 |
| EP | 3109666 A1 | | 12/2016 | |

(Continued)

OTHER PUBLICATIONS

EP Communication, Application No. 19150889.4, dated Nov. 3, 2021, 10 pages.

*Primary Examiner* — Vladimir Magloire
*Assistant Examiner* — Nuzhat Pervin
(74) *Attorney, Agent, or Firm* — Winston Hsu

(57) ABSTRACT

A motion sensing method includes monitoring for a first motion in a first region using a first antenna using a first motion detection parameter, when no first motion is sensed by the monitoring using the first antenna, monitoring for a second motion in a second region using a second antenna using a second motion detection parameter, and when no second motion is sensed by monitoring using the second antenna, designating a space, which encompasses the second region, as unoccupied, wherein the first region and the second region overlap one another, and the first motion detection parameter is different from the second motion detection parameter.

13 Claims, 21 Drawing Sheets

(56) References Cited

U.S. PATENT DOCUMENTS

| | | | | |
|---|---|---|---|---|
| 5,604,483 A * | 2/1997 | Giangardella | G08B 25/001 | |
| | | | 340/567 | |
| 7,221,118 B2 * | 5/2007 | Sasaki | E05F 15/43 | |
| | | | 49/28 | |
| 8,525,687 B2 * | 9/2013 | Tran | A61B 5/7264 | |
| | | | 340/506 | |
| 9,229,102 B1 * | 1/2016 | Wright | G01S 13/885 | |
| 9,316,727 B2 * | 4/2016 | Sentelle | G01V 3/12 | |
| 9,341,698 B1 * | 5/2016 | Sierens | G01S 3/38 | |
| 9,852,388 B1 * | 12/2017 | Swieter | G06Q 10/06313 | |
| 9,960,864 B2 * | 5/2018 | Mow | H04B 17/19 | |
| 10,008,875 B1 * | 6/2018 | Leabman | H02J 50/80 | |
| 10,158,259 B1 * | 12/2018 | Leabman | H02J 50/80 | |
| 10,437,012 B1 * | 10/2019 | Gurin | G02B 13/001 | |
| 10,534,819 B2 * | 1/2020 | Ricci | G01S 19/42 | |
| 10,983,188 B2 * | 4/2021 | Koga | G01S 7/527 | |
| 2003/0207668 A1 * | 11/2003 | McFarland | H03H 7/48 | |
| | | | 370/276 | |
| 2004/0125012 A1 * | 7/2004 | Okamura | G01S 13/04 | |
| | | | 342/28 | |
| 2006/0061504 A1 * | 3/2006 | Leach | G01S 13/426 | |
| | | | 342/28 | |
| 2007/0052576 A1 * | 3/2007 | Hausner | G01S 13/04 | |
| | | | 342/195 | |
| 2007/0057761 A1 * | 3/2007 | Johnson | G01S 13/522 | |
| | | | 340/8.1 | |
| 2008/0129581 A1 * | 6/2008 | Douglass | G01S 7/415 | |
| | | | 342/52 | |
| 2008/0303655 A1 * | 12/2008 | Johnson | G08G 1/01 | |
| | | | 342/28 | |
| 2009/0227882 A1 * | 9/2009 | Foo | A61B 5/7207 | |
| | | | 343/893 | |
| 2010/0321184 A1 * | 12/2010 | Dreuillet | G01S 13/878 | |
| | | | 340/540 | |
| 2011/0175766 A1 * | 7/2011 | Peczalski | G01S 13/589 | |
| | | | 342/28 | |
| 2012/0068876 A1 * | 3/2012 | Bangera | H04N 21/44218 | |
| | | | 342/61 | |
| 2012/0149301 A1 * | 6/2012 | Wiley | H02J 50/12 | |
| | | | 455/67.11 | |
| 2012/0212374 A1 * | 8/2012 | Kirby | G06F 3/0346 | |
| | | | 342/451 | |
| 2012/0299733 A1 * | 11/2012 | Knibbe | H05B 47/13 | |
| | | | 340/573.1 | |
| 2013/0005280 A1 * | 1/2013 | Leung | G01S 7/023 | |
| | | | 455/90.1 | |
| 2013/0135137 A1 * | 5/2013 | Mulder | G01S 3/48 | |
| | | | 342/28 | |
| 2014/0001977 A1 | 1/2014 | Zacharchuk | | |
| 2014/0011460 A1 * | 1/2014 | Ali | H04B 17/13 | |
| | | | 455/75 | |
| 2014/0070958 A1 * | 3/2014 | Foo | A61B 5/742 | |
| | | | 340/870.07 | |
| 2014/0266018 A1 * | 9/2014 | Carobolante | H04B 5/0037 | |
| | | | 320/108 | |
| 2015/0141794 A1 * | 5/2015 | Foo | A61B 5/6891 | |
| | | | 600/407 | |
| 2015/0154849 A1 * | 6/2015 | Matsui | G01S 17/04 | |
| | | | 342/28 | |
| 2016/0039340 A1 * | 2/2016 | Schantz | B60Q 9/008 | |
| | | | 340/435 | |
| 2016/0128164 A1 * | 5/2016 | Koehler | F21K 9/232 | |
| | | | 315/307 | |
| 2016/0363303 A1 * | 12/2016 | Creasman | F21V 23/0471 | |
| 2017/0095125 A1 * | 4/2017 | Tsuiki | E03D 5/105 | |
| 2017/0246329 A1 * | 8/2017 | Lloyd | A61L 2/084 | |
| 2017/0309038 A1 * | 10/2017 | Dorster | G01J 5/0025 | |
| 2018/0027179 A1 * | 1/2018 | Matsuzaki | H04N 5/23238 | |
| | | | 348/38 | |
| 2018/0069295 A1 * | 3/2018 | Han | H01Q 9/42 | |
| 2018/0163934 A1 * | 6/2018 | Miller | F21L 4/005 | |
| 2020/0166623 A1 * | 5/2020 | Sahin | G01S 7/006 | |

FOREIGN PATENT DOCUMENTS

| | | | |
|---|---|---|---|
| GB | 2253107 A * | 8/1992 | G01S 11/10 |
| JP | 2004150822 A | 5/2004 | |

* cited by examiner

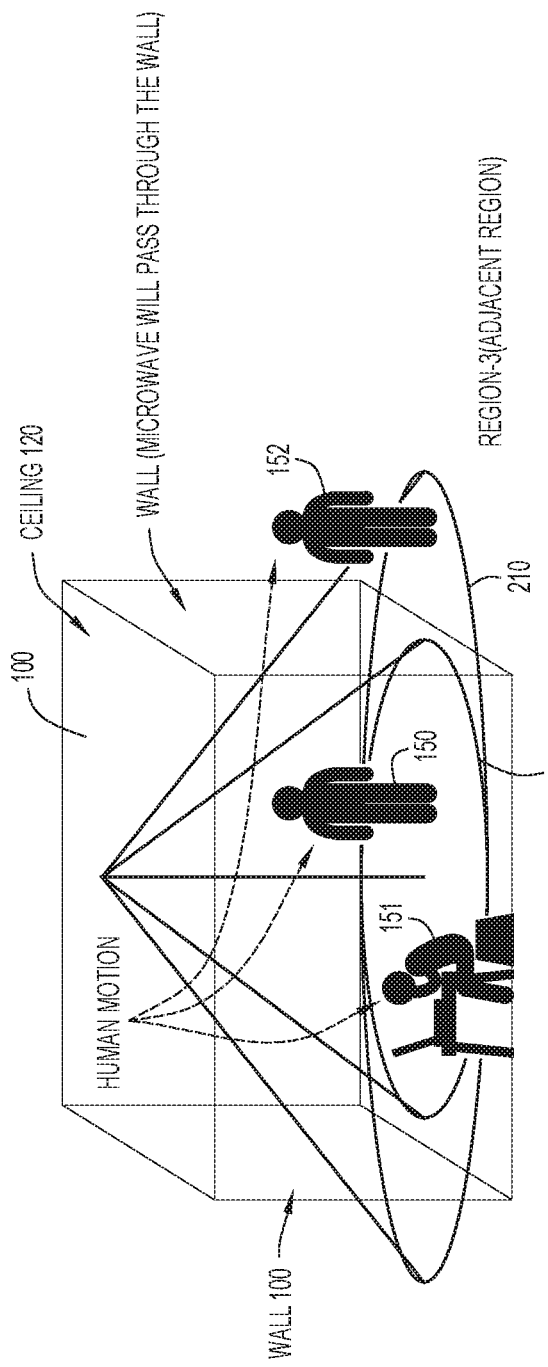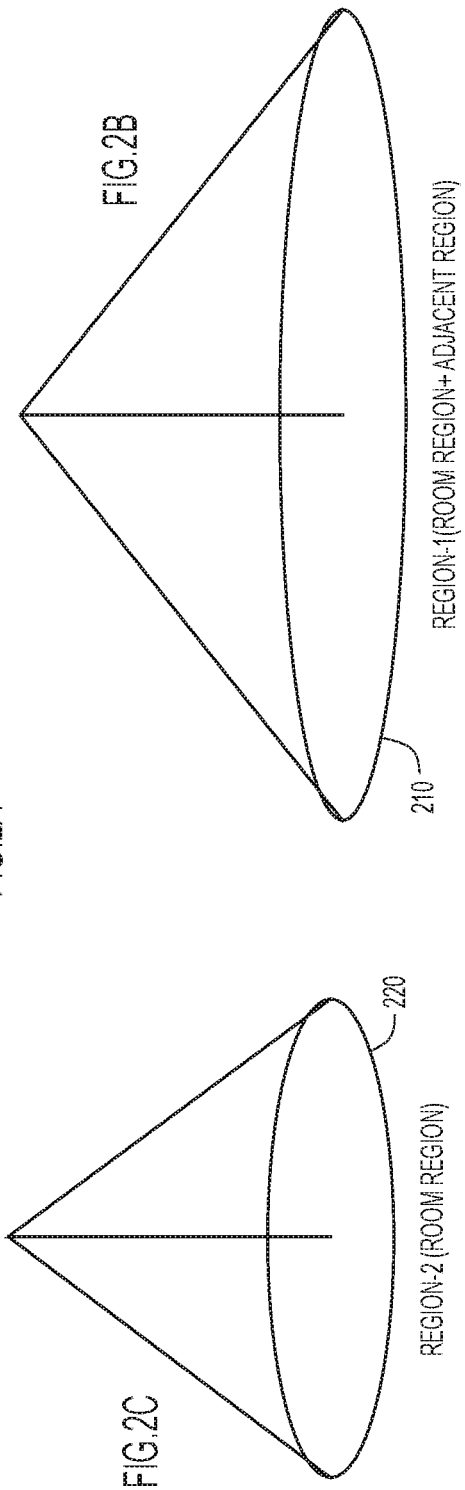

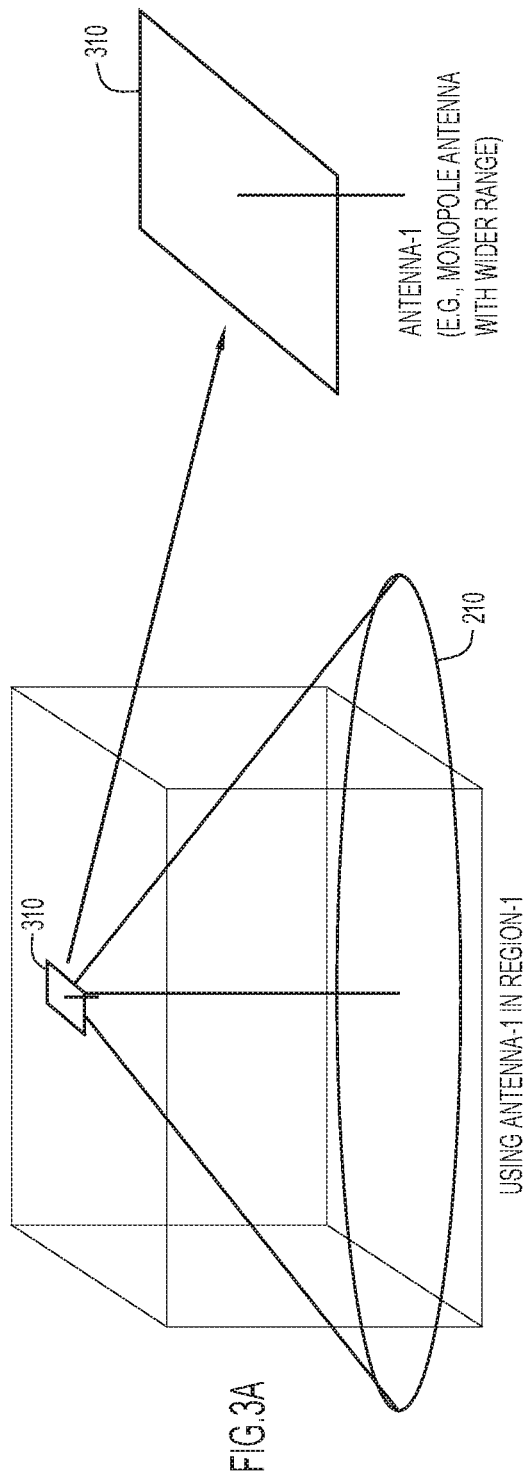
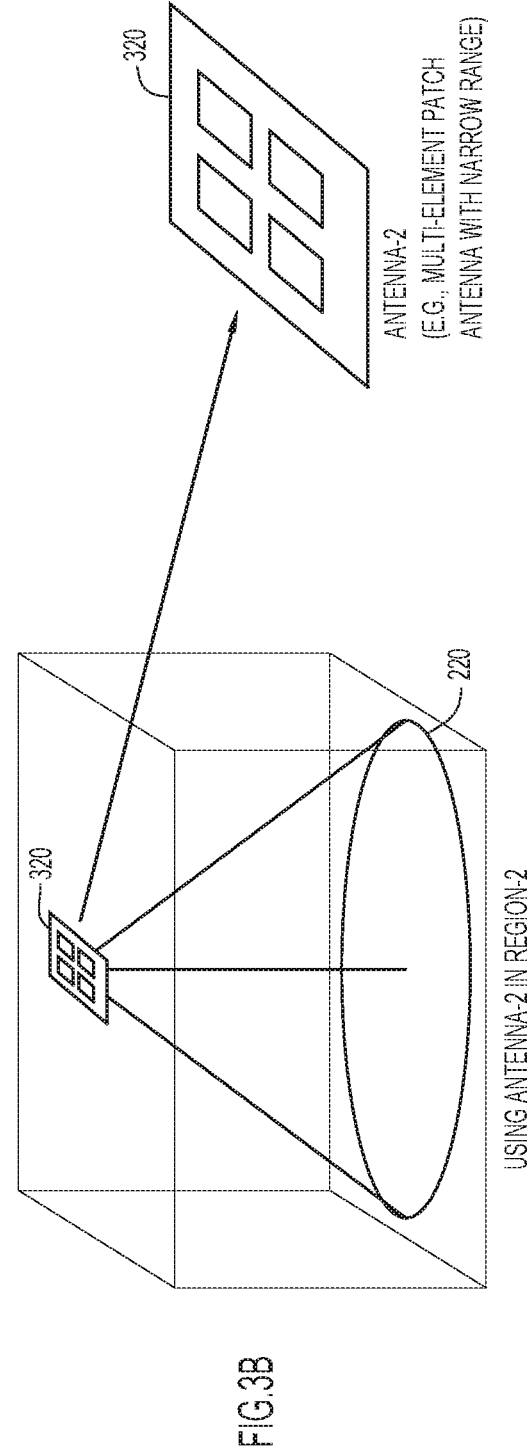

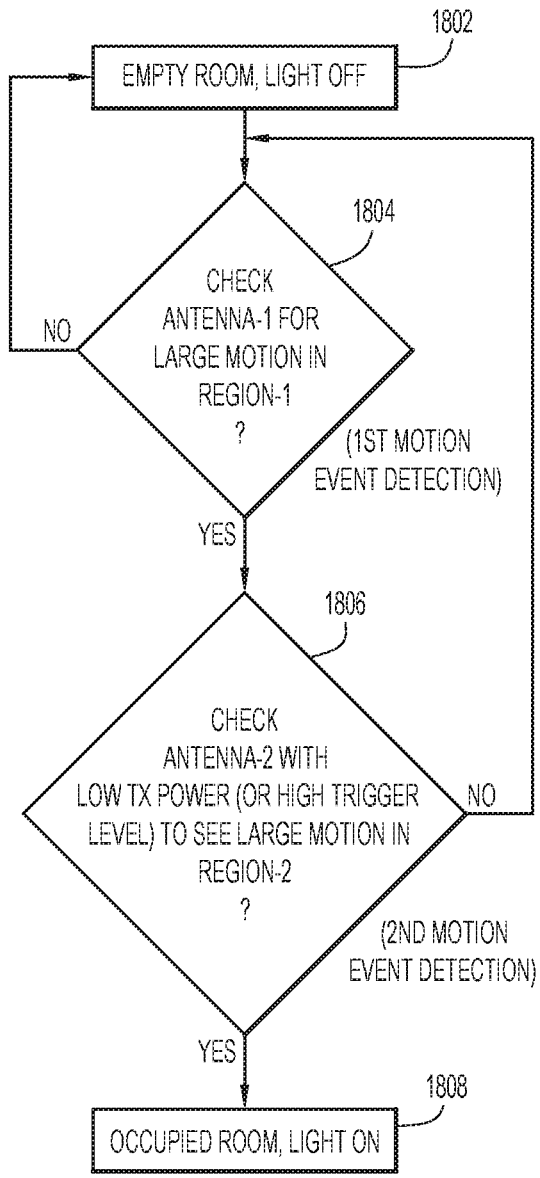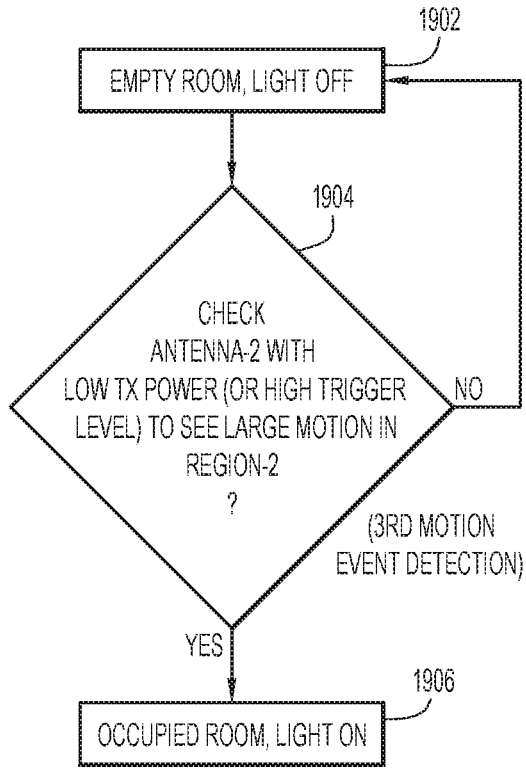
FIG.18
FIG.19

OCCUPANCY DETECTION USING MULTIPLE ANTENNA MOTION SENSING

FIELD OF THE INVENTION

The present invention relates to detecting motion in a given space or room, and specifically to methodologies that more accurately sense the presence of a person in the given space or room, and that are effective against false positive motion detection.

BACKGROUND

It is sometimes desirable to control an illumination or other device using motion detection in a room. In this way, it is possible to reduce wasteful power consumption that can be caused by a user's failure to turn off a light when leaving a room. Once approach to motion detection is to use a Doppler radar sensor. Such a sensor may control a light source to be turned on and/or off in accordance with a detected result indicative of the presence of a person in a room.

A Doppler radar sensor is designed to transmit a radio frequency (RF) electric wave (transmission wave), e.g., a millimeter wave, in a detectable range, and receive a corresponding reflection wave, combine (multiply) an electric signal corresponding to the reflection wave, and extract from the obtained electric signal a component of a frequency band corresponding to a moving speed of a person due to Doppler effect. Then, by comparing with a preset comparison threshold, the Doppler radar sensor can determine whether or not a person is present in the detectable range (e.g., in the space or room).

One problem with conventional Doppler radar motion detection is false positive detection, and also failure to detect a person in a room, when that person does not engage in any significant motion. It is therefore desirable to provide improved Doppler radar motion sensing.

SUMMARY

Described herein are methods to sense motion. In one embodiment, a method includes monitoring for a first motion in a first region using a first antenna using a first motion detection parameter, when no first motion is sensed by the monitoring using the first antenna, monitoring for a second motion in a second region using a second antenna using a second motion detection parameter, and when no second motion is sensed by monitoring using the second antenna, designating a space, which encompasses the second region, as unoccupied, wherein the first region and the second region overlap one another, and the first motion detection parameter is different from the second motion detection parameter.

In another embodiment, a motion sensing method is provided. The method employs a first antenna and a second antenna. The method includes monitoring for a first motion in a first region using the first antenna using a first motion detection parameter, when no first motion is sensed by the monitoring using the first antenna, monitoring for a second motion in a second region using the second antenna using a second motion detection parameter, when no second motion is sensed by monitoring using the second antenna, monitoring for a third motion in the first region using the first antenna using a third motion detection parameter, and when no third motion is sensed by monitoring using the first antenna using the third motion detection parameter, designating a space, which encompasses the first region, as unoccupied, wherein a beam width of the second antenna is wider than a beam width of the first antenna, the first region and the second region overlap one another, the first motion detection parameter is different from the third motion detection parameter, and the second motion detection parameter is different from the third motion detection parameter In yet another embodiment, an apparatus is provided and includes a switch, a first antenna communicatively couple to a first output of the switch, a second antenna communicatively coupled to a second output of the switch, a transmitter communicatively coupled to an input of the switch, wherein the switch is configured to supply radio frequency (RF) energy from the transmitter to the first antenna and the second antenna, alternately, and a motion detection circuit that is configured to detect motion by analyzing RF signals, responsive to the RF energy, alternately received at the first antenna and the second antenna

BRIEF DESCRIPTION OF THE DRAWINGS

FIG. 2A is similar to FIG. 1, but further includes a first region (FIG. 2B) and a second region (FIG. 2C) overlaid on the room, wherein the first region is inclusive of the room and an area adjacent the room, and the second region substantially encompasses only the room, in accordance with an embodiment of the invention.

FIG. 3A shows a first antenna, such as a monopole antenna, that is configured to sense motion in the first region, in accordance with an embodiment of the invention.

FIG. 3B shows a second antenna, such as a multi-element patch antenna, that is configured to sense motion in the second region, in accordance with an embodiment of the invention.

FIG. 18 shows example operations of a state machine for determining whether a room is occupied, in accordance with an embodiment of the invention.

FIG. 19 shows example operations of another state machine for determining whether a room is occupied, in accordance with an embodiment of the invention.

Like reference numerals have been used to identify like elements throughout this disclosure.

DETAILED DESCRIPTION

Figure 1:
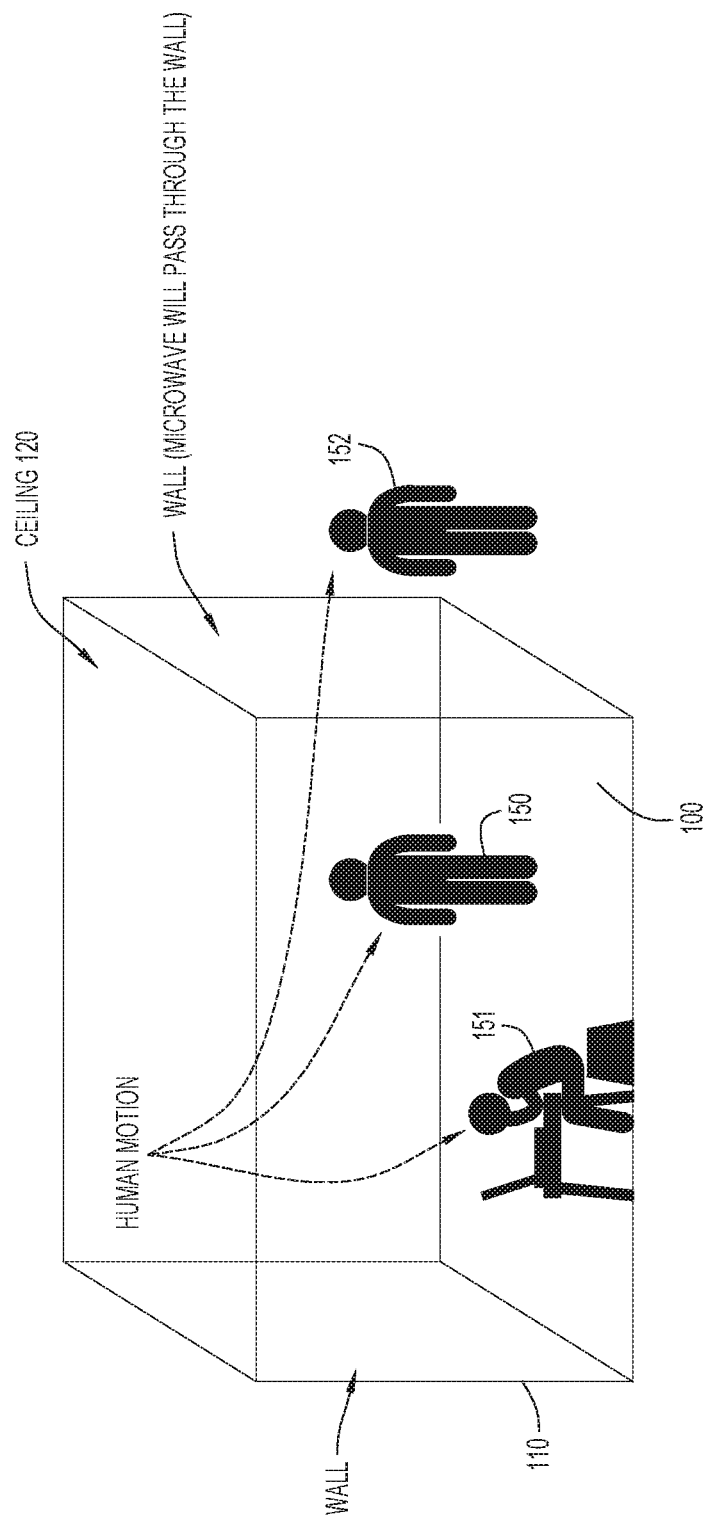
FIG. 1 shows a person in a given space or room, and a person outside of, or adjacent to, that space or room.

FIG. 1 shows a person in a given space or room, and a person outside of, or adjacent to, that space or room. That is, a room 100 is enclosed by walls 110 and a ceiling 120. While it may be desirable to detect whether the room 100 is occupied or not by a person 150 or 151, it is not desirable to detect a person 152 outside of, or adjacent, the room 100 as being inside the walls 110. The person 152 might be detected because the motion sensing microwave signals can pass through wall 100.

FIG. 2A is similar to FIG. 1, but further includes a first region 210 (shown independently in FIG. 2B) and a second region 220 (shown independently in FIG. 2C) overlaid on the room 100, wherein the first region 210 is inclusive of the room 100 and an area adjacent the room 100, and the second region 220 substantially encompasses only the room 100, in accordance with an embodiment of the invention. As will be explained further below, motion sensing, such as Doppler radar motion sensing, can be controlled and/or restricted to encompass substantially only the first region 210 and the second region 220 independently. By sensing in two different regions, with, possibly, different power levels, it is possible to better discern whether a given room is occupied.

FIG. 3A shows a first antenna (antenna-1) 310 having a relatively wider beam width, such as a monopole antenna, that is configured to sense motion in the first region 210, in accordance with an embodiment of the invention. That is, antenna-1 310 is configured to have a transmission pattern, and refection reception pattern, that captures motion in the first region 210.

FIG. 3B shows a second antenna (antenna-2) 320 having a relatively narrower beam width, such as a multi-element patch antenna, that is configured to sense motion in the second region 220, in accordance with an embodiment of the invention. That is, antenna-2 320 is configured to have a transmission pattern, and reflection reception pattern, that captures motion in the second region 220, which is substantially confined to room 100. The beam width of the first antenna (antenna-1) 310 is wider than the beam width of the second antenna (antenna-2) 320 in accordance with an embodiment of the invention.

Figure 4:
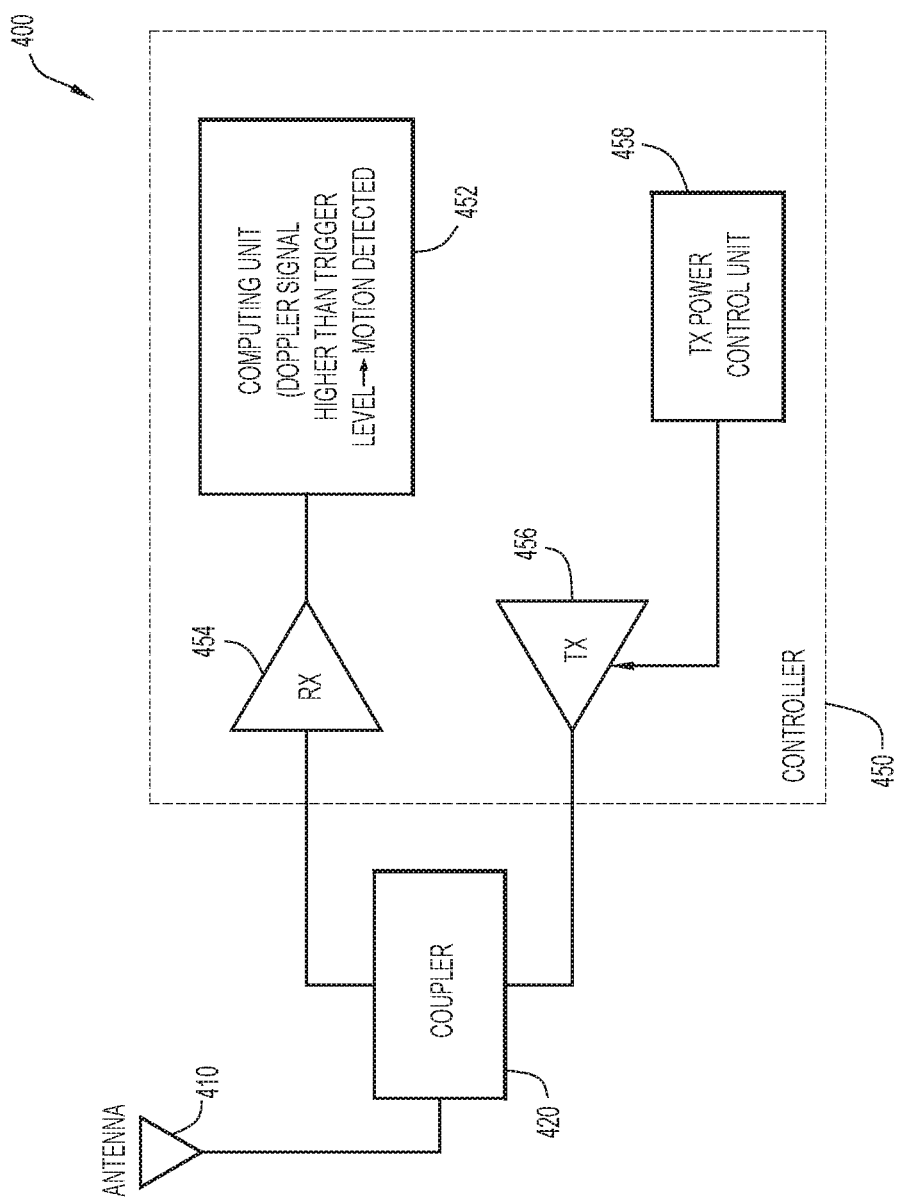
FIG. 4 shows a motion sensor using a single antenna, in accordance with an embodiment of the invention.

FIG. 4 shows a motion sensor, such as a RF motion sensor or a Doppler radar motion sensor, using a single antenna, in accordance with an embodiment of the invention. Specifically, the motion sensor 400 includes an antenna 410 that is in communication with a coupler 420. The coupler 420, in turn, is in communication with a controller 450. The controller 450 includes a computing unit 452, a radio frequency (RF) receiver 454 that is connected to one port of the coupler 420, an RF transmitter 456 that is connected to another port of the coupler 420, and a transmitter power control unit 458 in communication with the transmitter 456. The controller 450 is configured to control RF transmission (e.g., power level via transmitter power control unit 458) and reception (including trigger level via computing unit 452) through antenna 410. Antenna 410 could be either a monopole antenna or a multi-element patch antenna, like those illustrated in, e.g., FIGS. 3A and 3B.

Figure 5:
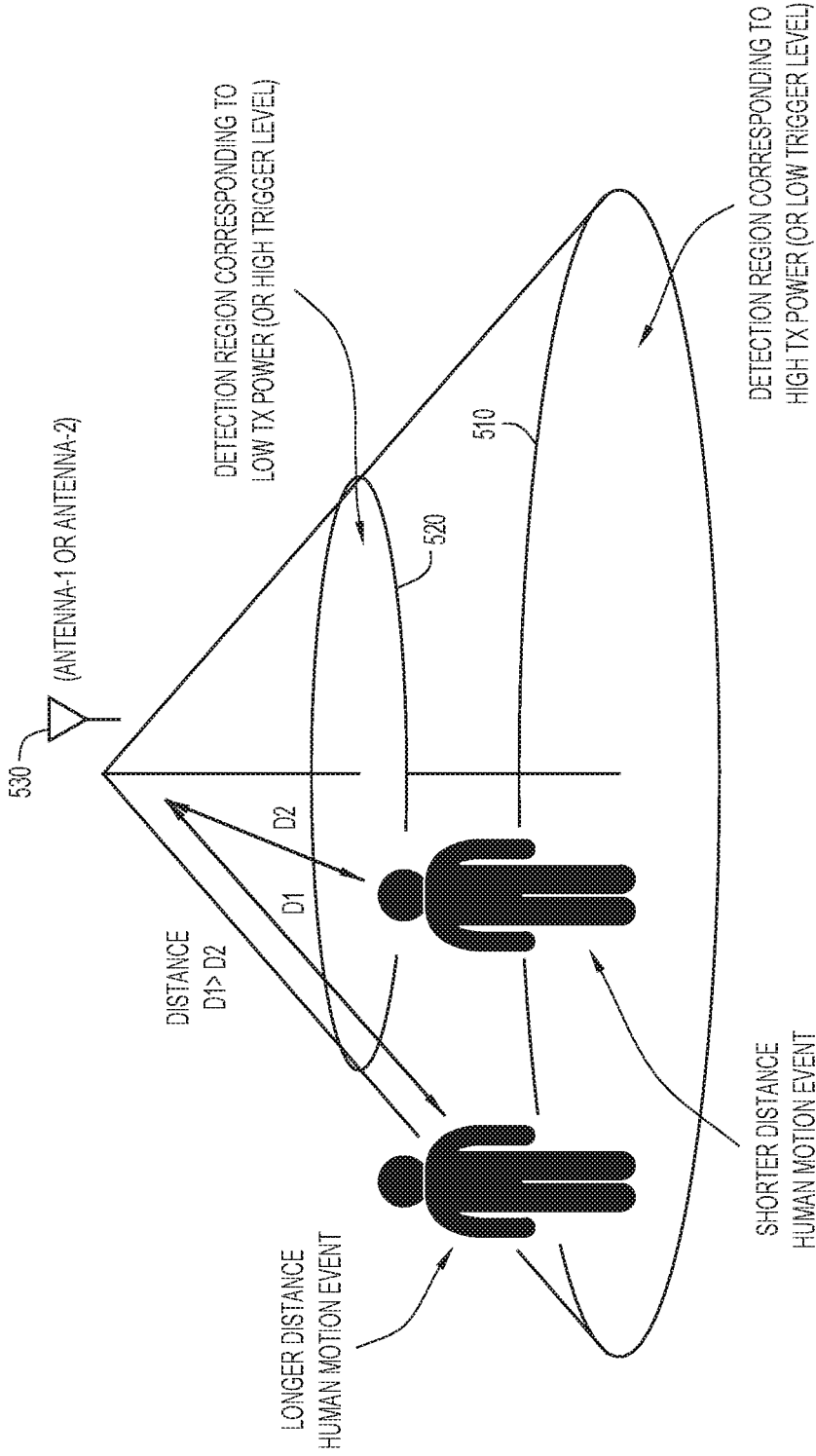
FIG. 5 shows an approach to detecting motion in a room using a single antenna, using different power levels or different trigger levels, in accordance with an embodiment of the present invention.

FIG. 5 shows an approach to detecting motion in a room using a single antenna, using different power levels or different trigger levels, in accordance with an embodiment of the present invention. As shown, it is possible to detect motion at longer distances 510 and shorter distances 520 using a single antenna 530, by controlling how much power is transmitted by the antenna 530 and/or how a detection trigger level is configured. In general, for a relatively wider motion detection region 510 corresponding to a relatively longer distance D1, higher transmit (TX) power can be used, resulting in a larger resulting signal. Alternatively, for a given power level, a lower trigger detection threshold can be used in a computing unit (e.g., 452). For a relatively narrower motion detection region 520 corresponding to a relatively shorter distance D2, lower transmit power can be used, resulting in a lower resulting signal. Alternatively, for a given power level, a higher trigger detection threshold can be used in a computing unit (e.g., 452). In sum, for detecting longer distance motion: higher TX power→larger resulting signal→easier to detect motion at longer distance; lower trigger level→easier to detect motion at longer distance. For detecting shorter distance motion: lower TX power→smaller resulting signal→only can detect motion at a shorter distance; higher trigger level→only can detect motion at a shorter distance. In general, the value of a power level (high/low) or the value of a trigger level (low/high) may be referred to as a "motion detection parameter." That is, the motion detection parameter includes but is not limited to the value of a power level and the value of a trigger level.

Figure 6:
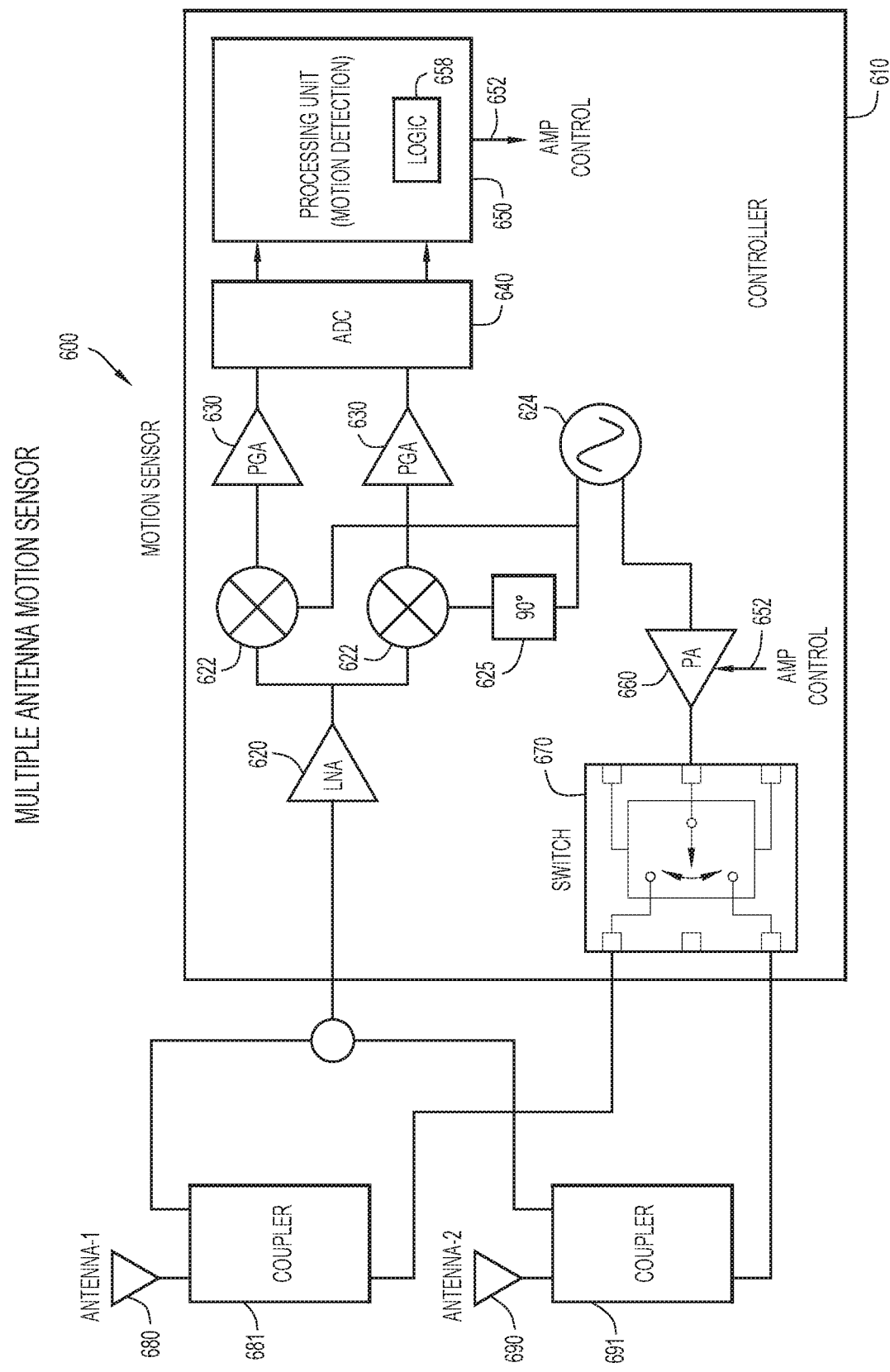
FIG. 6 shows a motion sensor using multiple antennas and two couplers, in accordance with an embodiment of the invention.

FIG. 6 shows a motion sensor, such as a RF motion sensor or a Doppler radar motion sensor, using multiple antennas and two couplers, in accordance with an embodiment of the invention. That is, FIG. 6 shows a motion sensor 600 using multiple antennas 680, 690 and two couplers 681, 691. motion sensor 600 includes a controller 610 that includes a low noise amplifier (e.g., an RF receiver) 620, mixers 622, respectively being fed by an oscillator 624 directly, or via a 90 degree phase shifter, programmable gain amplifiers (PGAs) 630 connected to respective outputs of the mixers 622, an analog-to-digital convert (ADC) 640 configured to receive respective outputs of the PGAs 630 and supply respective digital I and Q signals to a processing unit 650. Oscillator 624 is also configured to supply an RF signal to power amplifier 660. An output of power amplifier 660 supplies an amplified RF signal to switch 670. Switch 670 has two outputs. A first output is connected to coupler 681 to supply an amplified RF signal to antenna 680, and a second output is connected to coupler 691 to supply an amplified RF signal to antenna 690. The power of a given amplified signal supplied to the antennas 680, 690 may differ from one another in accordance with an amplifier control signal 652, as will be explained further below, and as explained briefly in connection with FIGS. 4 and 5. The couplers 681, 691 are arranged to permit an RF signal to be transmitted to its respective antenna 680, 690, and to allow the antenna to receive RF signals when not transmitting, and to pass such received signal to LNA 620. The switch 670, and the amplifier control signal 652, may be under the control of logic 658, which may be stored in, and executed by, processing unit 650.

As will be explained below in connection with several different embodiments, logic 658 may control amplifier power level, trigger level and/or switch 670 to more accurately detect the presence of a person in a room or predetermined space. At a high level, power amplifier 660 transmits an RF (e.g., radar) signal to switch 670 with an adjustable power level, and LNA 620 receives a reflected RF signal from the two antennas 680, 690 through the two couplers 681, 691. This embodiment permits switching between antenna-1 680 and antenna-2 690 to transmit RF signals from the two antennas alternatively, and to receive reflected RF signals via the two antennas 680, 690 simultaneously.

Figure 7:
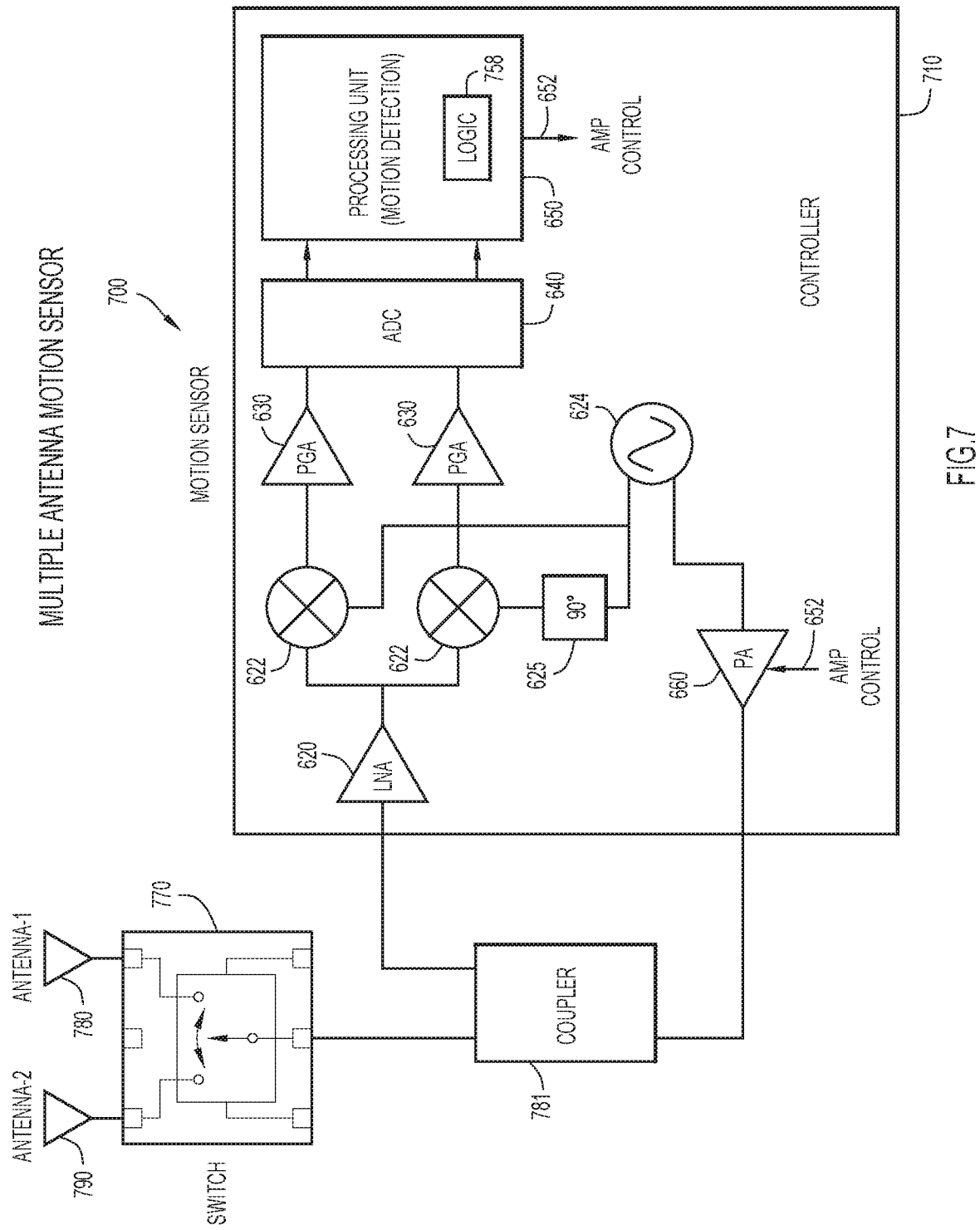
FIG. 7 shows a motion sensor using multiple antennas and one coupler, in accordance with an embodiment of the invention.

FIG. 7 shows a motion sensor 700, such as a RF motion sensor or a Doppler radar motion sensor, using multiple antennas and one coupler, in accordance with an embodiment of the invention. The embodiment of FIG. 7 is substantially similar to the embodiment shown in FIG. 6, except switch 770 is disposed closer to antennas 780, 790 (i.e., not necessarily within or part of controller 710) and only one coupler 781 is employed. In this embodiment, power amplifier 660 transmits RF signals (with adjustable power) to switch 770 via coupler 781, and LNA 620 receives reflected RF signals from switch 770 via coupler 781. Switch 770 enables switching between antenna-1 780 and antenna-2 790 to transmit and receive RF signals alternatively. Logic 758 may be configured to control appropriate power levels and switch timing.

Figure 8:
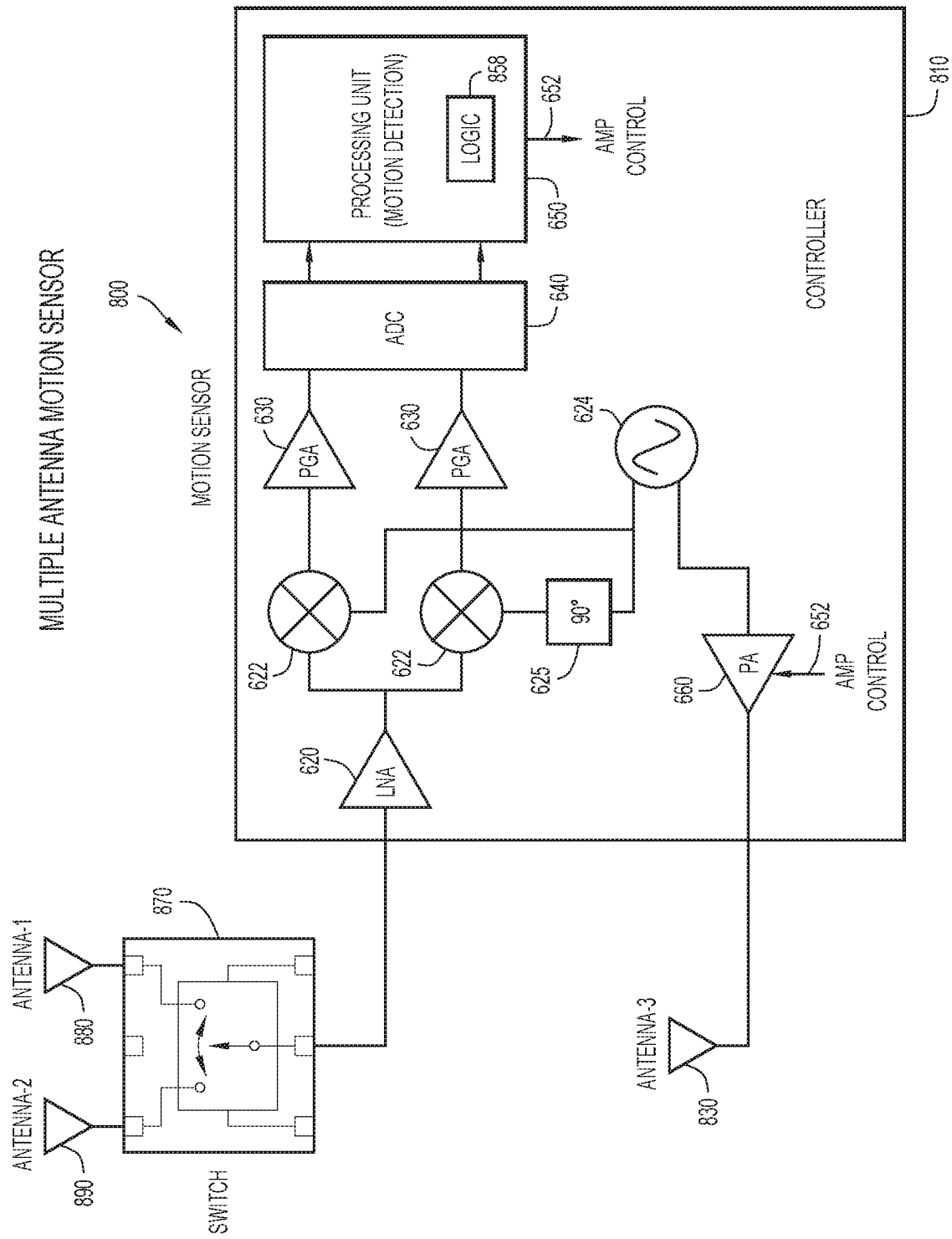
FIG. 8 shows a motion sensor using multiple antennas without couplers, in accordance with an embodiment of the invention.

FIG. 8 shows a motion sensor 800, such as a RF motion sensor or a Doppler radar motion sensor, using multiple antennas without couplers, in accordance with an embodiment of the invention. The embodiment of FIG. 8 is substantially similar to the embodiment shown in FIG. 7, except three antennas are used, and no coupler is employed. That is, antenna-1 880 and antenna-2 890 are used effectively as receive-only antennas via switch 870, while antenna 830 is coupled to power amplifier 660. In this embodiment, LNA 620 receives RF signals via antennas 880, 890, and power amplifier (with adjustable power level) 660 feeds antenna-3 830. In this way, the switch 870 switches between antenna-1 880 and antenna-2 890 to receive a reflected RF signal alternatively. Logic 858 may be configured to control appropriate power levels and switch timing.

Figure 9:
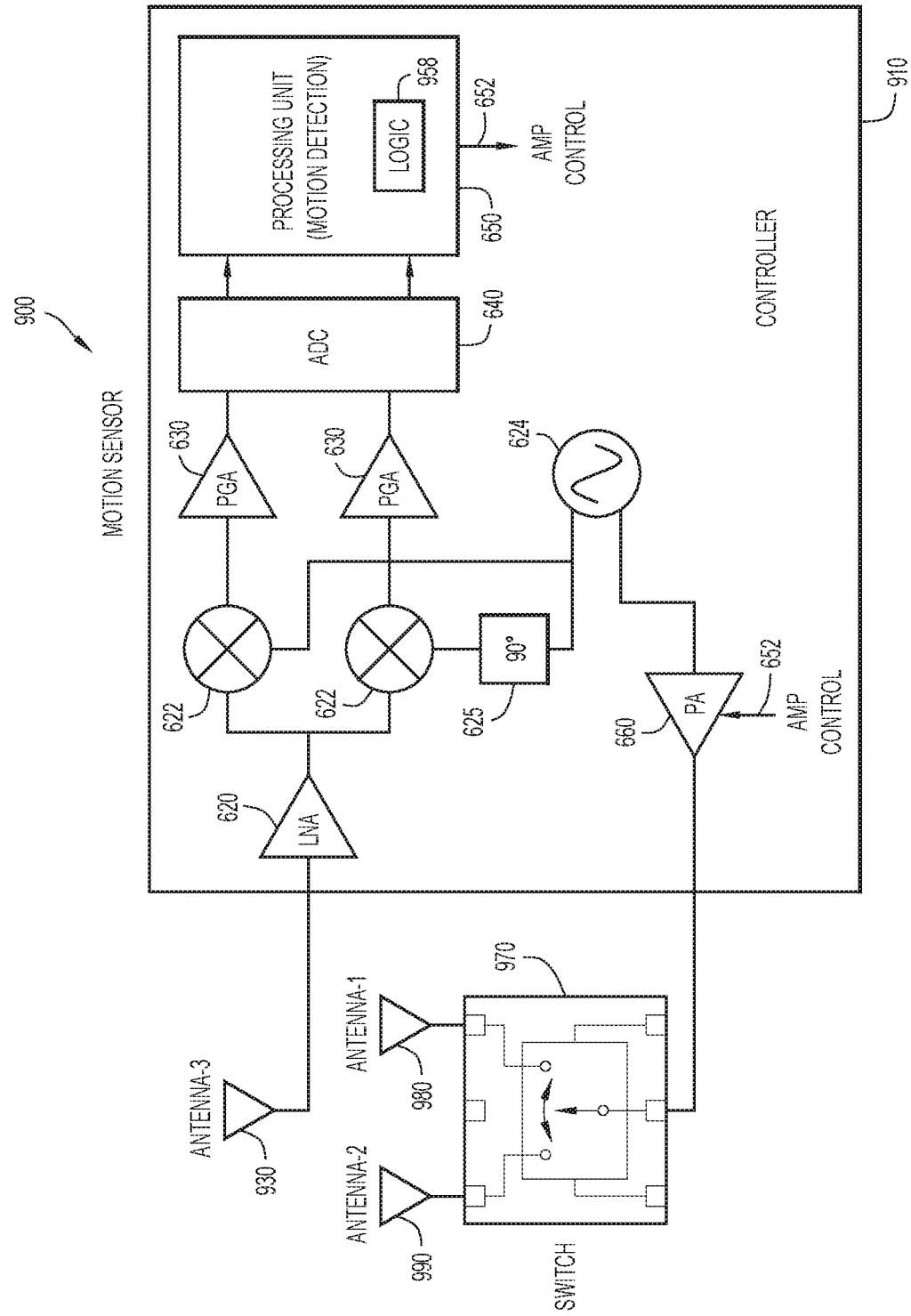
FIG. 9 shows a motion sensor using multiple antennas without any couplers, in accordance with another embodiment of the invention.

FIG. 9 shows a motion sensor 900, such as a RF motion sensor or a Doppler radar motion sensor, using multiple antennas without any couplers, in accordance with another embodiment of the invention. The embodiment of FIG. 9 is substantially similar to the embodiment shown in FIG. 8, where three antennas are used, without any couplers. As shown, antenna-1 980 and antenna-2 990 are used effectively as transmit-only antennas via switch 970, while antenna-3 930 is coupled to LNA 620. Thus, in this embodiment, LNA 620 receives all RF reflection signals directly, and antennas 980, 990 are fed by power amplifier (with adjustable power level) 660 via switch 970. In this way, the switch 970 switches between antenna-1 980 and antenna-2 990 to transmit RF signals alternatively, and LNA 620 receives all reflected RF signals via antenna-3 930. Logic 958 may be configured to control appropriate power levels and switch timing.

Figure 10:
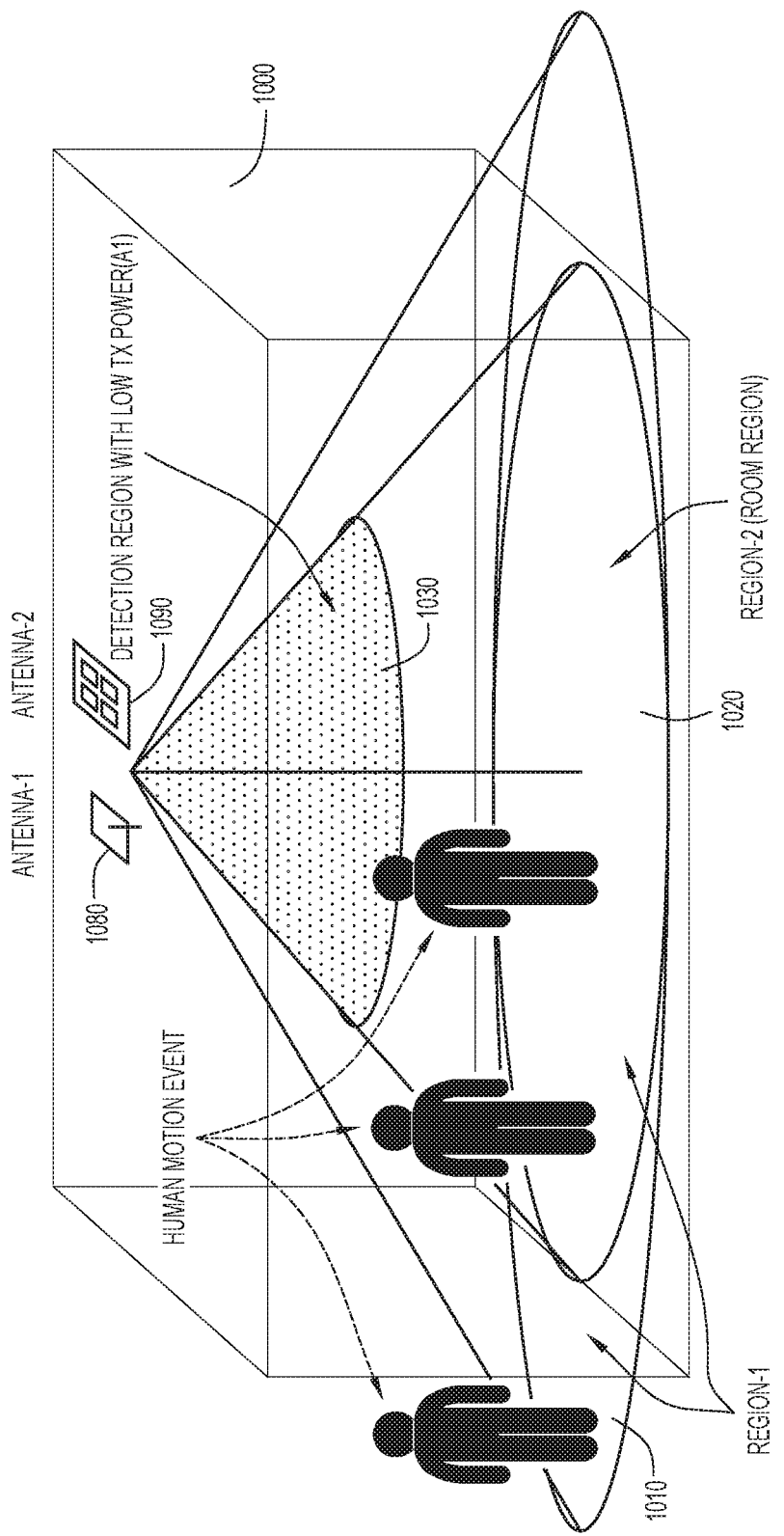
FIG. 10 shows the use of dynamic power adjustment to detect motion, in accordance with an embodiment of the invention.

FIG. 10 shows the use of dynamic power adjustment to detect motion, in accordance with an embodiment of the invention. In this case, two antennas are deployed, antenna-1 1080 and antenna-2 1090. In the drawing, two regions are defined: region-1 1010 that encompasses the room 1000 and an adjacent area, and region-2 1020 that encompasses substantially only the room 1000. It is possible to detect human motion in part of the room 1000 (for example, a relatively narrower motion detection region 1030) using a low transmit power level (A1) via either antenna 1080, 1090. Such a low power level might, however, not detect motion in all parts of the room 1000.

Figure 11:
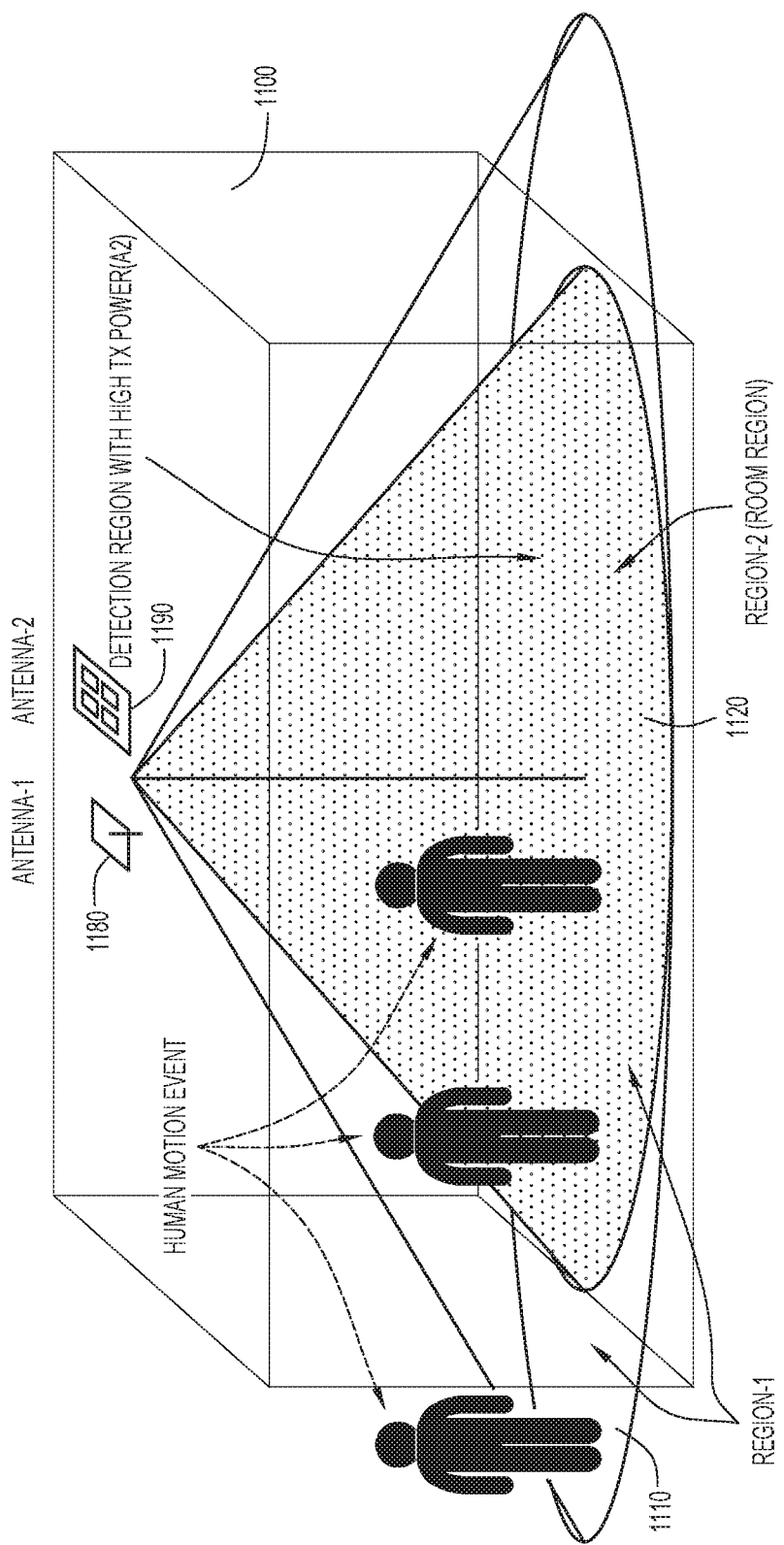
FIG. 11 shows the use of multiple antennas and dynamic power adjustment to detect motion, in accordance with an embodiment of the invention.

FIG. 11 shows the use of multiple antennas and dynamic power adjustment to detect motion, in accordance with an embodiment of the invention. In this case, two antennas are deployed, antenna-1 1180 and antenna-2 1190. In the drawing, two regions are defined: region-1 1110 that encompasses the room 1100 and an adjacent area, and region-2 1120 that encompasses substantially only the room 1100. It is possible to detect human motion in most of the room using a relatively high transmit power level (A2) via either antenna 1180, 1190. Such a high power level might, however, cause inadvertent detection as explained in connection with FIG. 12.

Figure 12:
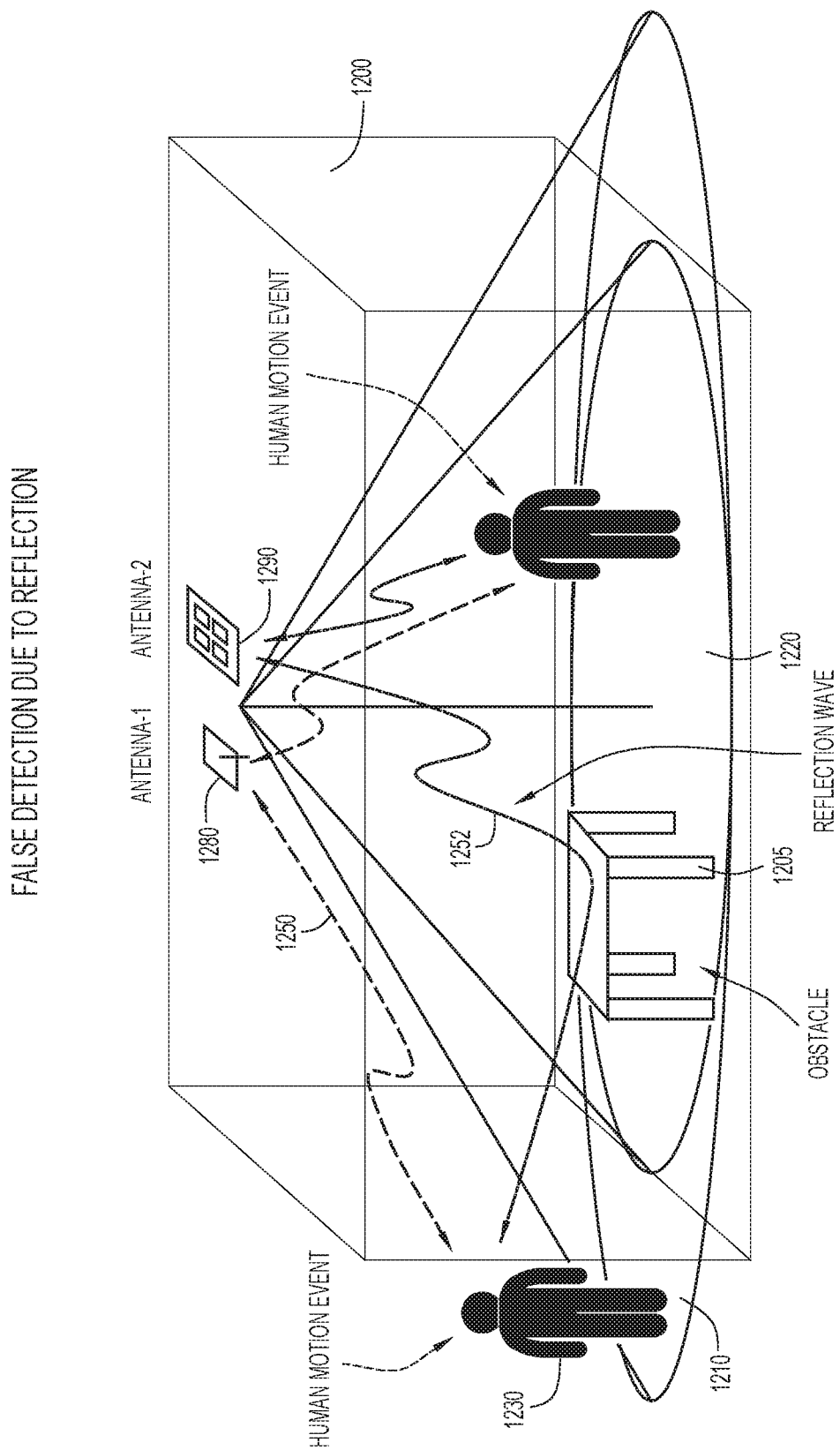
FIG. 12 shows a possibility of false positive motion detection in a room.

FIG. 12 shows a possibility of false positive motion detection in a room. As shown, two antennas are deployed, antenna-1 1280 and antenna-2 1290, and either antenna can be impacted as explained below. In the drawing, two regions are defined: region-1 1210 that encompasses the room 1200 and an adjacent area, and region-2 1220 that encompasses substantially only the room 1200. If transmitted power is sufficiently high, then a person outside of the room, i.e., a person 1230 still in region-1 1210, might be falsely detected as being inside room 1200, via reflection wave 1250 by antenna-1 1280. Similarly, a wave 1252 might be deflected by an obstacle 1205 and toward person 1230 outside of room 1200. In other words, antenna-2 1290 could receive a reflection wave reflected by an obstacle 1205 of a human motion (for example, a motion caused by the person 1230) outside of the room 1200. As such, false positive motion detection can easily occur since both antennas can receive a reflection wave reflected by a person 1230.

Figure 13:
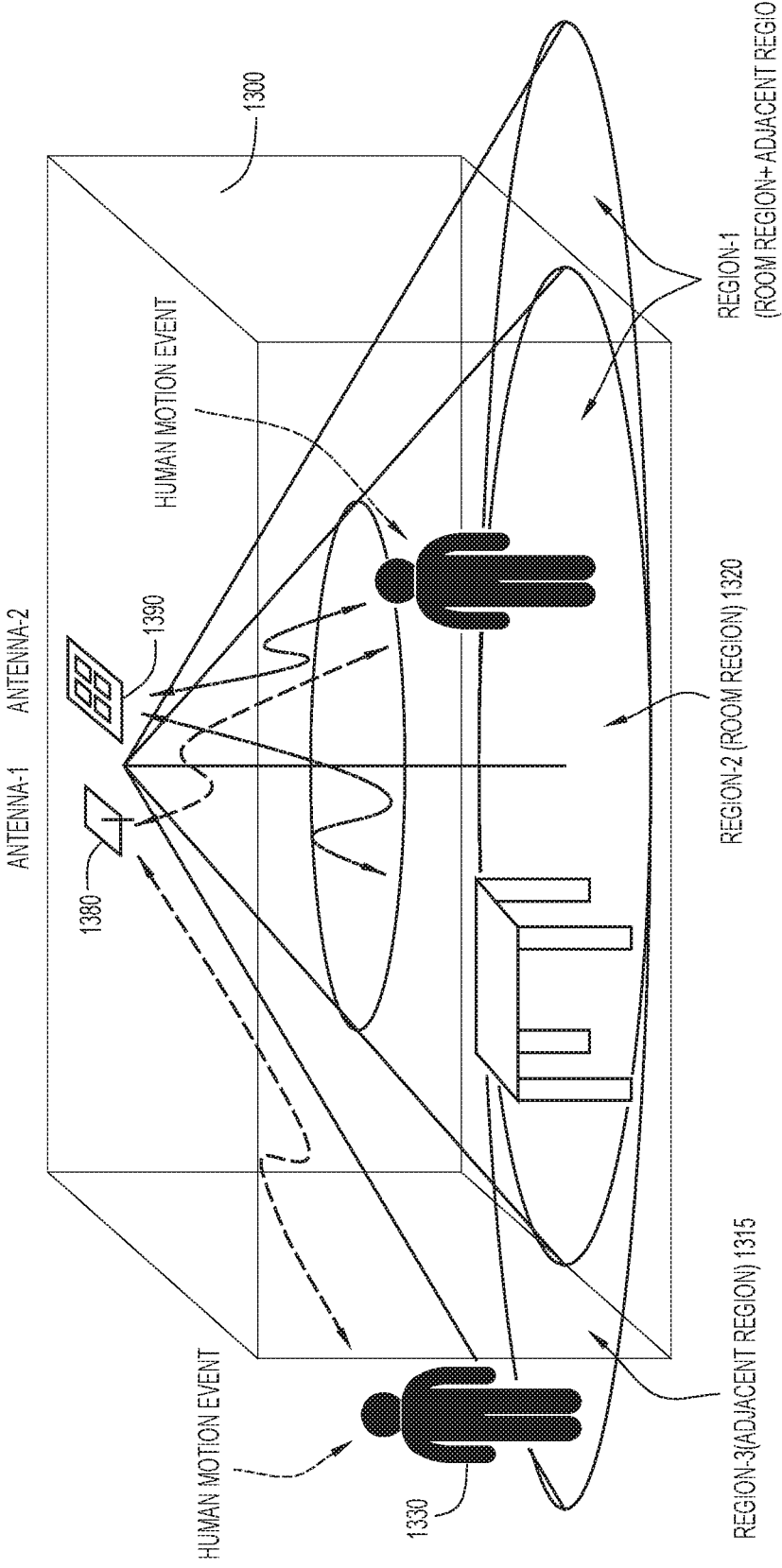
FIG. 13 shows the use of multiple antennas to overcome the problem of false positive motion detection, in accordance with an embodiment of the present invention.

FIG. 13 shows the use of multiple antennas to overcome the problem of false positive motion detection, in accordance with an embodiment of the present invention. In this case, two antennas are deployed, antenna-1 1380 and antenna-2 1390. As in other embodiments, two regions are defined: region-1 1310 that encompasses the room 1300 and an adjacent area, and region-2 1320 that encompasses substantially only the room 1300. In addition a region-3 1315 is defined that encompasses substantially only the adjacent area of the room 1300. In accordance with an embodiment, and as will be further explained in connection with several state diagrams described below, motion in region-2 1320 can be detected by both antenna-1 1380 and antenna-2 1390.

That is, both antennas can receive a reflected wave. However, in adjacent region-3 1315, motion caused by a person 1330 may be detected only by antenna-1 1380, but not antenna-2 1390, by reducing the power transmitted by antenna-2 1390 to a lower level (or setting a threshold detection level higher).

Figure 14:
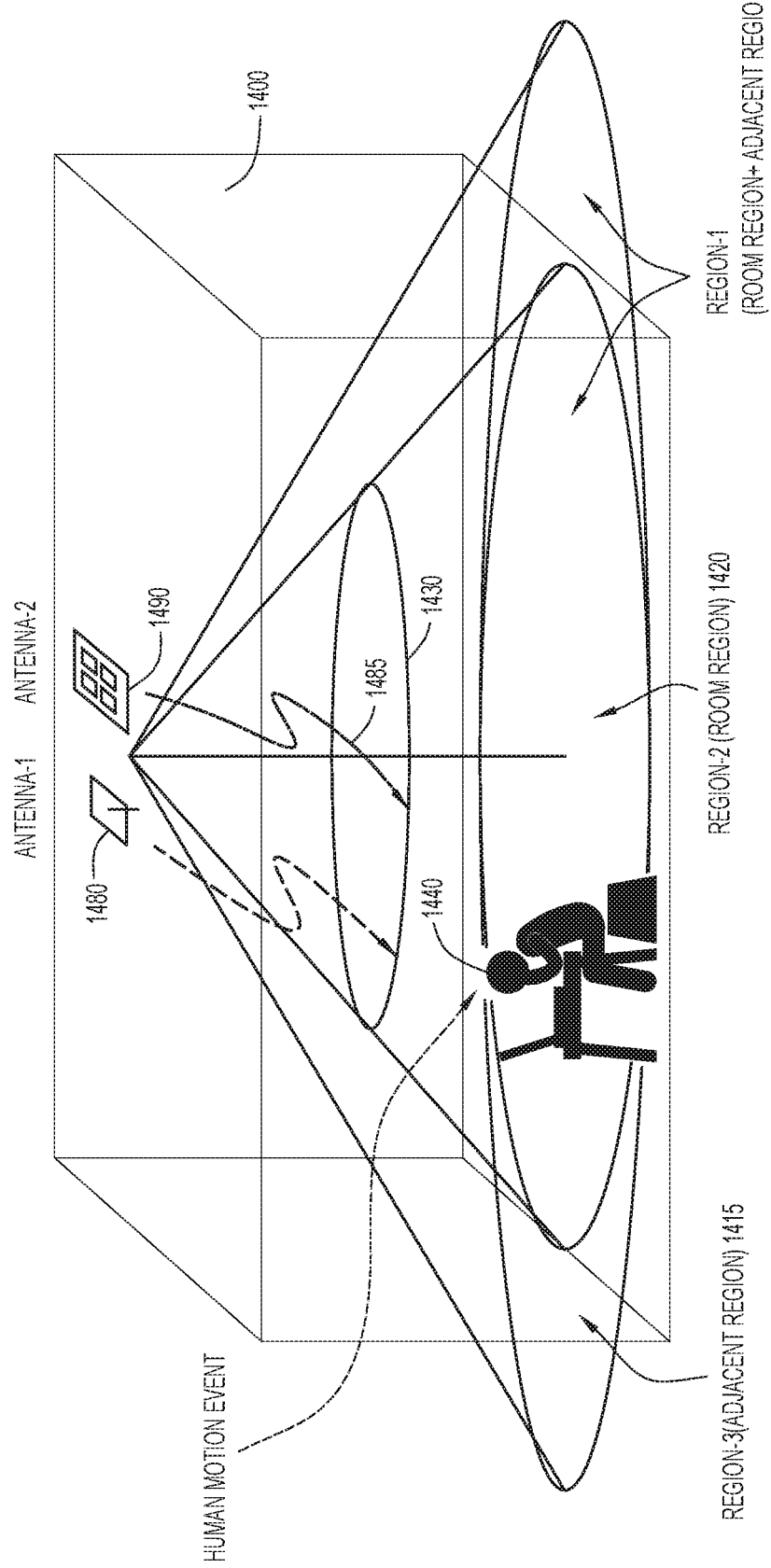
FIG. 14 shows a possibility of failing to properly detect minor motion in a room.

FIG. 14 shows a possibility of failing to properly detect minor motion in a room. Here, two antennas are deployed, antenna-1 1480 and antenna-2 1490. As in other embodiments, two regions are defined: region-1 1410 that encompasses the room 1400 and an adjacent area, and region-2 1420 that encompasses substantially only the room 1400. In addition, a region-3 1415 is defined that encompasses substantially only the adjacent area of the room 1400. When antenna 1490 transmits relatively low power, a transmitted wave 1485 may only travel a certain distance 1430, or not have enough power to produce a reflected wave. Such transmitted waves may be unable to detect minor motion of a person 1440, such as minimal hand motion related to typing on a laptop computer or other handheld device. That is, relatively low transmit power level from antenna-2 1490 may not provide sufficient signal strength to detect minor motion in region-2 1420, and antenna-1 1480 also may not be able to detect minor motion since the gain of antenna-1 1480 (e.g., a monopole antenna) may be small.

Figure 15:
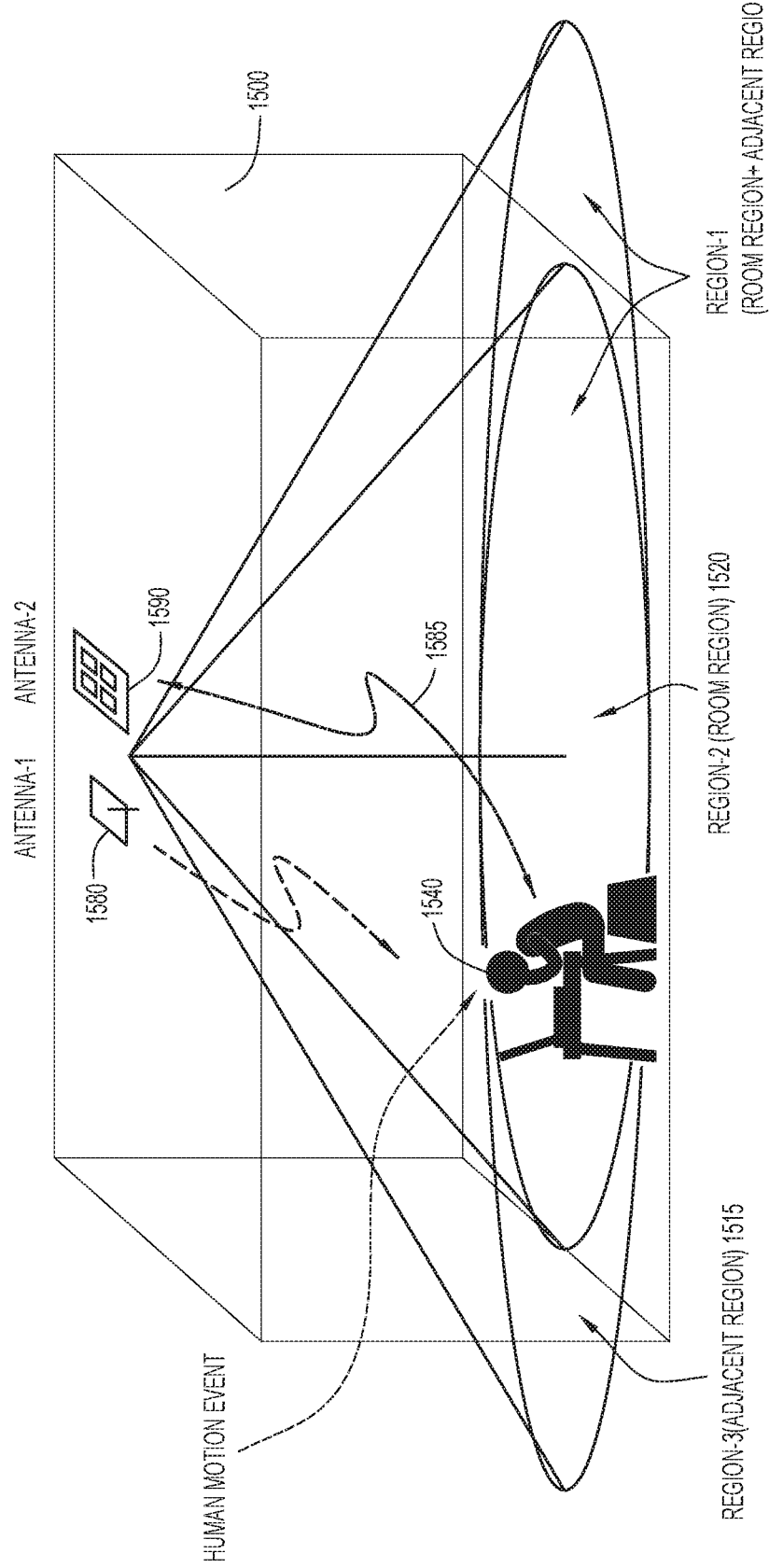
FIG. 15 shows the use of multiple antennas to overcome the problem of failing to detect minor motion in a room, in accordance with an embodiment of the present invention.

FIG. 15 shows the use of multiple antennas to overcome the problem of failing to detect minor motion in a room, in accordance with an embodiment of the present invention. Two regions are defined: region-1 1510 that encompasses the room 1500 and an adjacent area, and region-2 1520 that encompasses substantially only the room 1500. In addition, a region-3 1515 is defined that encompasses substantially only the adjacent area of the room 1500. To overcome the issue of failing to detect minor motion in region-2 1520, namely inside room 1500, antenna-2 can transmit a higher power wave 1585, which can provide enough signal strength to detect minor motion in region-2 1520. Antenna-1 1580 may still not be able to detect minor motion since the gain of antenna-1 1580 (e.g., a monopole antenna) may be small.

Figure 16:
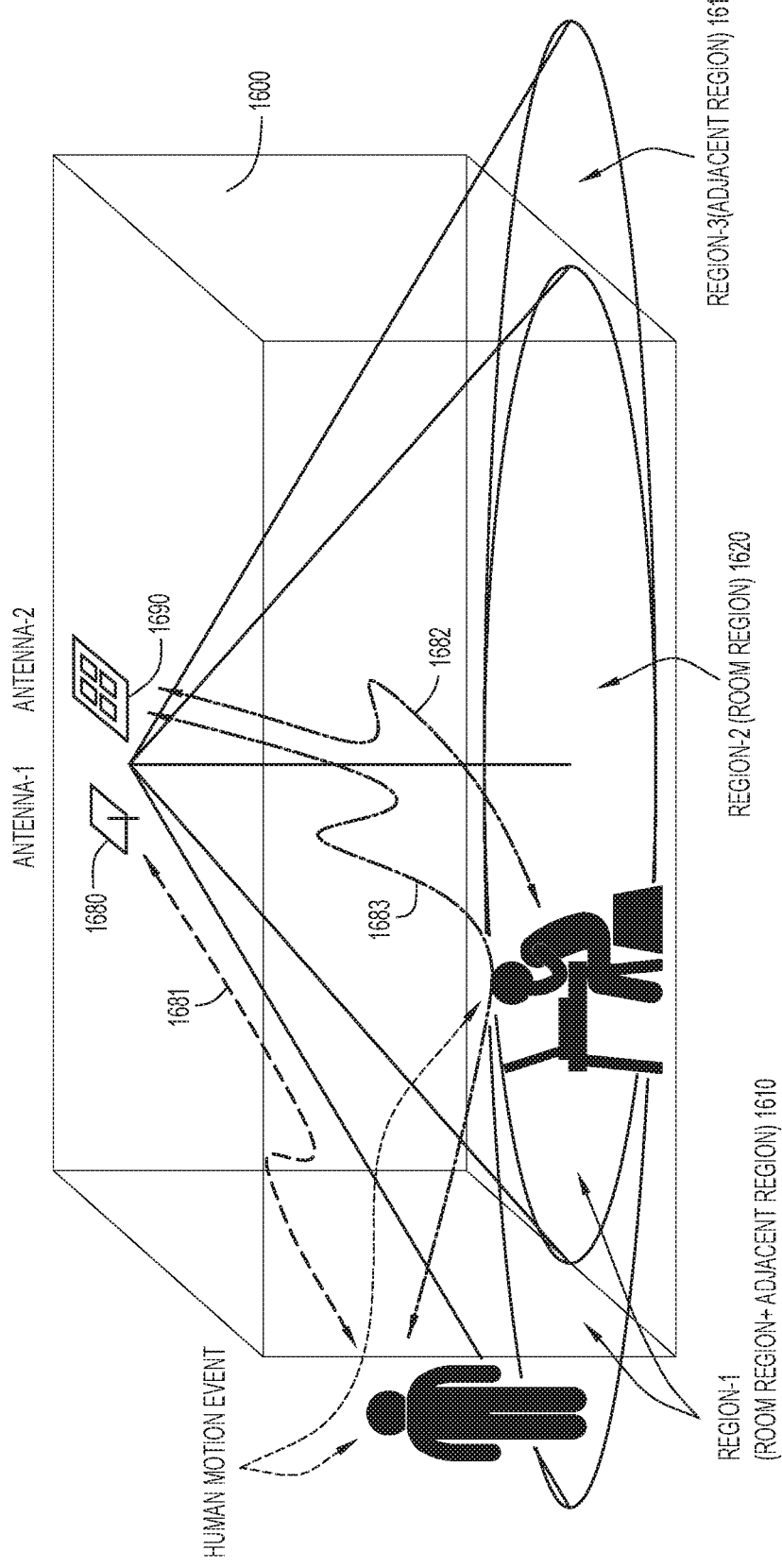
FIG. 16 illustrates an issue with distinguishing large motion in the first region and minor motion in the second region.

FIG. 16 depicts an issue with distinguishing large motion in the first region and minor motion in the second region. As with similar embodiments, two regions are defined: region-1 1610 that encompasses the room 1600 and an adjacent area, and region-2 1620 that encompasses substantially only the room 1600. In addition, a region-3 1615 is defined that encompasses substantially only the adjacent area of the room 1600. As shown in this figure, both large motion in region-3 1615 and minor motion in region-2 1620 can be detected by transmitting high power level wave from antenna-2 1690. That is, antenna-1 1680 can transmit and receive a wave 1681 and antenna-2 1690 can transmit and receive a wave 1682. A wave 1683 can also be transmitted by antenna-2 1690, be deflected by an obstacle or person and be received by antenna-2 1690. A problem in the scenario described is that it is difficult to distinguish between large motion in the adjacent area (i.e., region-3 1615) versus minor motion in region-2 1620.

Figure 17:
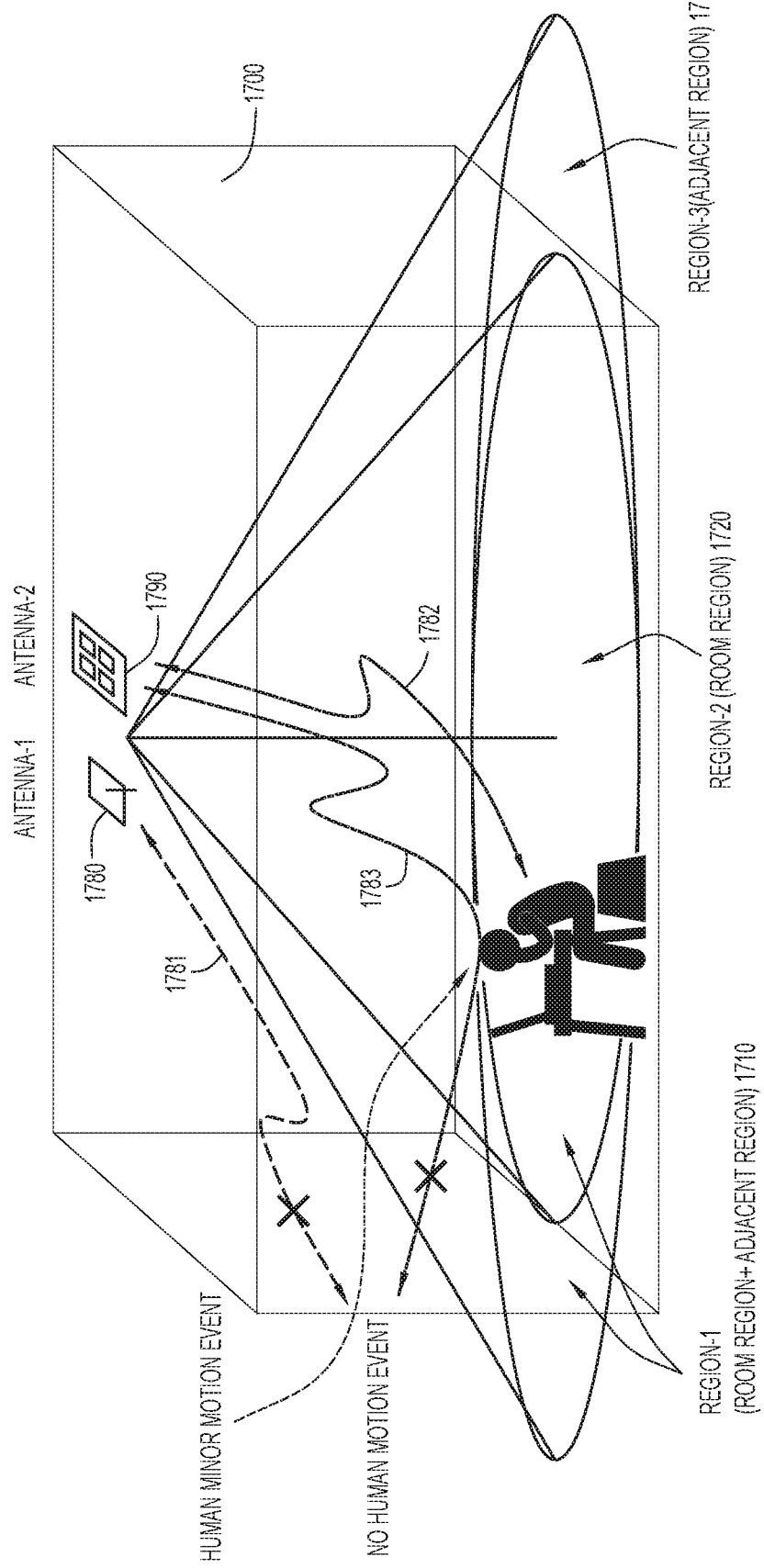
FIG. 17 shows the use of multiple antennas to overcome the problem of failing to distinguish large motion in the first region and minor motion in the second region, in accordance with an embodiment of the present invention.

FIG. 17 shows the use of multiple antennas to overcome the problem of failing to distinguish large motion in the first region and minor motion in the second region, in accordance with an embodiment of the present invention. Two regions are defined: region-1 1710 that encompasses the room 1700 and an adjacent area, and region-2 1720 that encompasses substantially only the room 1700. In addition, a region-3 1715 is defined that encompasses substantially only the adjacent area of the room 1700. As shown in this figure, to confirm that only minor motion is detected in region-2 1720, region-2 is checked with high transmission power only after no motion is detected in region-1 1710. That is, once it is determined that antenna-1 1780 does not receive any reflected waves 1781, and antenna-2 1790 does not receive any reflected wave 1783, this means that it is unlikely that anyone is moving in region-3 1715. Wave 1782 from antenna-2 1790 is thus the only wave that should have meaning related to minor motion in room 1700.

The following state diagrams, depicted in FIGS. 18-23, may be implemented using any of the motion sensors illustrated by FIGS. 6-9, i.e., a motion sensor that has at least two antennas, and logic that can control both transmitted power and/or trigger level threshold for received reflected RF waves.

FIG. 18 shows example operations of a state machine for determining whether a room is occupied, in accordance with an embodiment of the invention. At state 1802, a room is deemed to be empty, and a light is off (or other device is set in an off or on state). At state 1804, a first antenna (e.g., antenna-1, a monopole antenna) is used to detect large motion in a first region (region-1) that encompasses both a room (or predetermined space) and an adjacent area to that room. If there is no large motion detected, the state returns to state 1802. If large motion is detected via the first antenna in region-1, then the state moves to state 1806 where, using relatively low transmit power (or a relatively high trigger level) large motion is detected, via a second antenna (e.g., antenna-2, a multi-element patch antenna)) in a second region (region-2) that encompasses substantially only the room. If no large motion is detected via antenna-2 in state 1806 the state returns to state 1804. If large motion is detected via antenna-2 then the room is designated as being occupied, and the light may be turned on in response (or another device may be toggled from its previously off or on state). The light or the device could be replaced by an apparatus, and an operation status of the apparatus associated with the predetermined space is changed when no first motion (e.g., large motion in the first region) is sensed and no second motion (e.g., large motion in the second region) is sensed in accordance with an embodiment of the invention. The first antenna has a relatively wider beam width and the second antenna has a relatively narrower beam width in accordance with an embodiment of the invention.

FIG. 19 shows example operations of another state machine for determining whether a room is occupied, in accordance with an embodiment of the invention. At state 1902, a room is deemed to be empty, and a light is off (or other device is set in an off or on state). At state 1904, using relatively low transmit power (or a relatively high trigger level) large motion is detected, via an antenna (e.g., antenna-2, a multi-element patch antenna) in a (second) region (e.g., region-2) that encompasses substantially only the room. If no large motion is detected via antenna-2 in state 1904 the state returns to state 1902. If large motion is detected via antenna-2 then the room is designated as being occupied, and the light may be turned on in response (or another device may be toggled from its previously off or on state).

Figure 20:
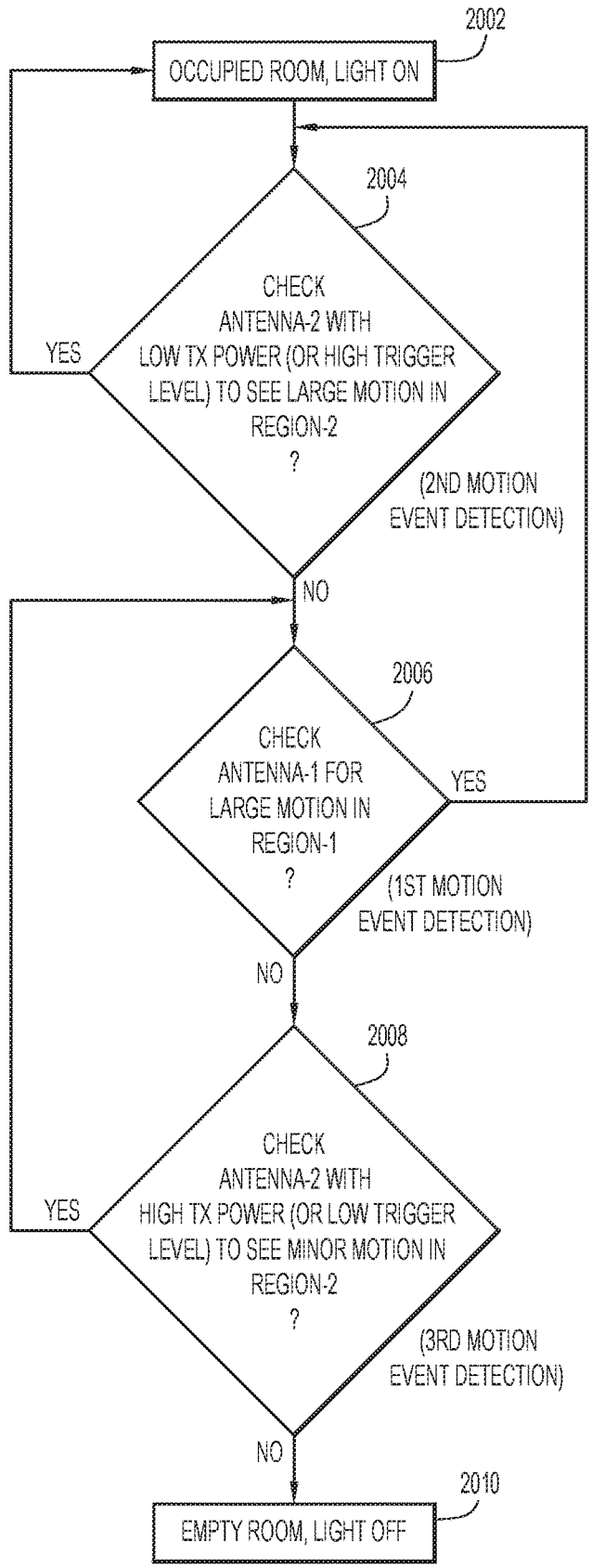
FIG. 20 shows example operations of a state machine for determining whether a room is no longer occupied, in accordance with an embodiment of the invention.

FIG. 20 shows example operations of a state machine for determining whether a room is no longer occupied, in accordance with an embodiment of the invention. At state 2002, a room is deemed to be occupied, and a light is on (or other device is set in an off or on state). At state 2004, using relatively low transmit power (or a relatively high trigger level) large motion is detected, via an antenna (e.g., antenna-2, a multi-element patch antenna) in a (second) region (e.g., region-2) that encompasses substantially only the room. If large motion is detected via antenna-2 in state 2004 the state returns to state 2002. If large motion is not detected via antenna-2 then, at state 2006, a (first) antenna (e.g., antenna-1, a monopole antenna) is used to detect large motion in a first region (region-1) that encompasses both the room, or predetermined space, and an adjacent area to that room. If a large motion is detected via antenna-1 (in region-1), then the state returns to state 2004. If a large motion is not detected via antenna-1 (in region-1) then the state moves to state 2008. At state 2008, using relatively high transmit power (or a low trigger level), antenna-2 is used to detect minor motion in region-2 (i.e., within the room only). If minor motion is detected via antenna-2 the state returns to state 2006. If no minor motion is detected via antenna-2 then the state proceeds to state 2010 where there room is designated as unoccupied (or empty), and the light is turned off (or another device may be toggled from its previously off or on state). The light or the device could be replaced by an apparatus, and an operation status of the apparatus associated with the predetermined space is changed when no second motion (e.g., large motion in the second region) is sensed, no first motion (e.g., large motion in the first region) is sensed and no third motion (e.g., minor motion in the second region) is sensed in accordance with an embodiment of the invention.

Figure 21:
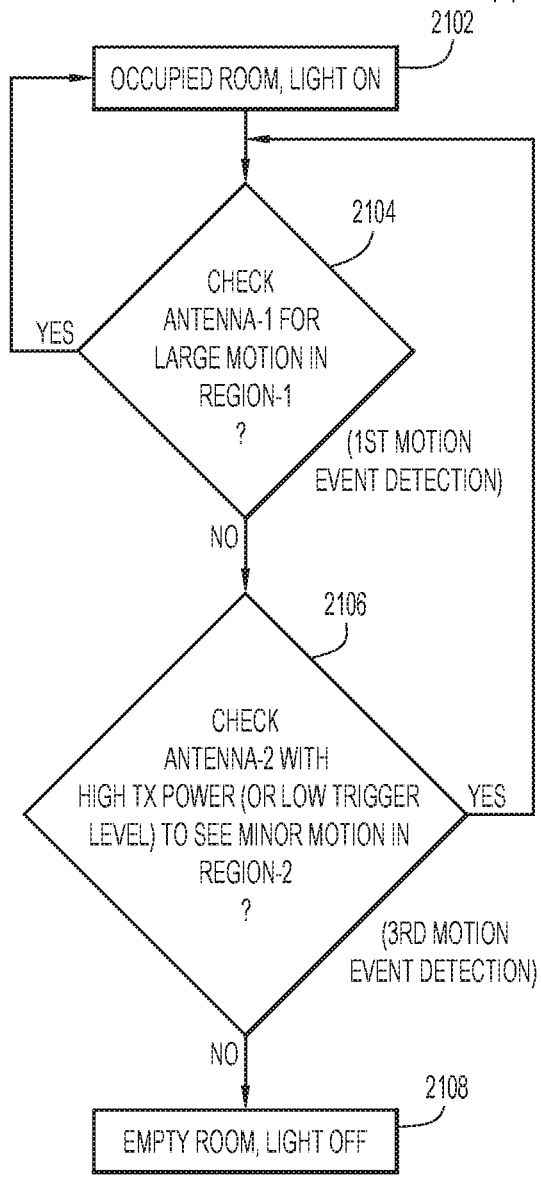
FIG. 21 shows example operations of another state machine for determining whether a room is no longer occupied, in accordance with an embodiment of the invention.

FIG. 21 shows example operations of another state machine for determining whether a room is no longer occupied, in accordance with an embodiment of the invention. At state 2102, a room is deemed to be occupied, and a light is on (or other device is set in an off or on state). At state 2104, a (first) antenna (e.g., antenna-1, a monopole antenna) is used to detect large motion in a first region (region-1) that encompasses both the room, or predetermined space, and an adjacent area to that room. If a large motion is detected via antenna-1 (in region-1), then the state returns to state 2102. If a large motion is not detected via antenna-1 (in region-1) then the state moves to state 2106. At state 2106, using relatively high transmit power (or a relatively low trigger level) minor motion is detected, via an antenna (e.g., antenna-2, a multi-element patch antenna) in a (second) region (e.g., region-2) that encompasses substantially only the room. If minor motion is not detected via antenna-2 then, at state 2108 the room is designated as unoccupied (or empty) and the light is turned off (or another device may be toggled from its previously off or on state). The light or the device could be replaced by an apparatus, and an operation status of the apparatus associated with the predetermined space is changed when no first motion (e.g., large motion in the first region) is sensed and no third motion (e.g., minor motion in the second region) is sensed in accordance with an embodiment of the invention.

Figure 22:
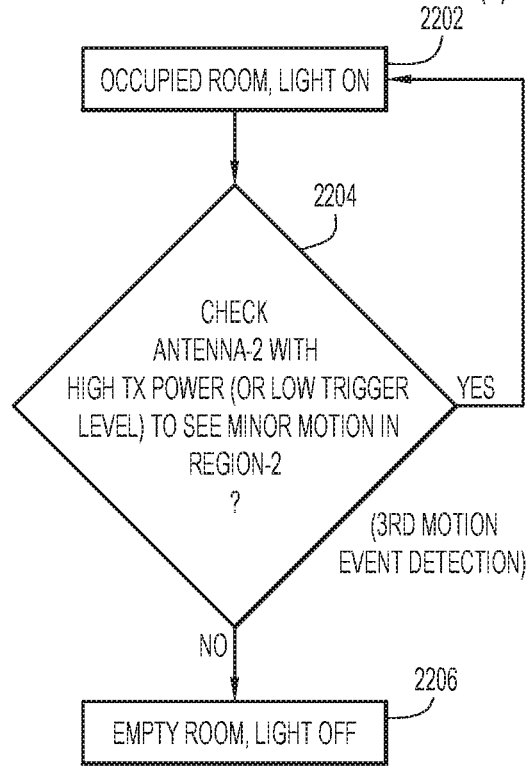
FIG. 22 shows example operations of another state machine for determining whether a room is no longer occupied, in accordance with an embodiment of the invention.

FIG. 22 shows example operations of another state machine for determining whether a room is no longer occupied, in accordance with an embodiment of the invention. At state 2202, a room is deemed to be occupied, and a light is on (or other device is set in an off or on state). At state 2204, using relatively high transmit power (or a relatively low trigger level) minor motion is detected, via an antenna (e.g., antenna-2, a multi-element patch antenna) in a (second) region (e.g., region-2) that encompasses substantially only the room. If minor motion is detected via antenna-2, then the state returns to state 2202. If minor motion is not detected via antenna-2 in state 2204, then, at state 2206 the room is designated as unoccupied (or empty) and the light is turned off (or another device may be toggled from its previously off or on state).

Figure 23:
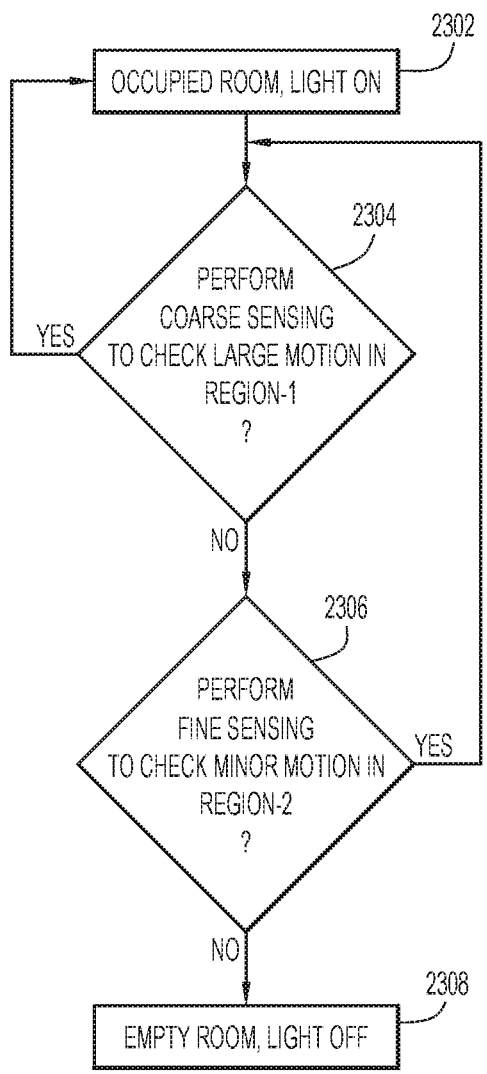
FIG. 23 shows example operations of another state machine for determining whether a room is no longer occupied, in accordance with an embodiment of the invention.

FIG. 23 shows example operations of another state machine for determining whether a room is no longer occupied, in accordance with an embodiment of the invention. This embodiment can be considered a higher level approach to detecting motion in a room using coarse and fine motion sensing using multiple antennas. At state 2302, a room is deemed to be occupied, and a light is on (or other device is set in an off or on state). At state 2304, coarse sensing for large motion detection using, e.g., a (first) antenna (e.g., antenna-1, a monopole antenna) is performed in a first region (region-1) that encompasses both the room, or predetermined space, and an adjacent area to that room. If large motion is detected in region-1, then the state returns to state 2302. If large motion is not detected in region-1, then the state moves to state 2306. At state 2306, fine sensing for minor motion is detection using, e.g., a (second) antenna (e.g., antenna-2, a multi-element patch antenna) is performed in a (second) region (e.g., region-2) that encompasses substantially only the room. If minor motion is not detected in region-2 then, at state 2308 the room is designated as unoccupied (or empty) and the light is turned off (or another device may be toggled from its previously off or on state). In accordance with an embodiment of the invention, a beam width of the first antenna is wider than a beam width of the second antenna, a first motion (large motion) is monitored or sensed in the first region by using the first antenna with a first motion detection parameter, and a second motion (minor motion) is monitored or sensed in the second region by using the second antenna with a second motion detection parameter. In one embodiment of the invention, the first motion detection parameter causes the first antenna to transmit RF energy at a first power, the second motion detection parameter causes the second antenna to transmit RF energy at a second power, and the second power is greater than the first power. In another embodiment of the invention, the first motion detection parameter causes the first motion to be sensed using a first trigger level, the second motion detection parameter causes the second motion to be sensed using a second trigger level, and the first trigger level is higher than the second trigger level.

In sum, the embodiments described herein provide methodologies and devices to perform improved motion detection using RF/Doppler radar motion sensing with single antenna or multiple antennas. The transmit power of each antenna can be controlled independently, and a trigger level for a received reflected wave can also be controlled to achieve more accurate motion detection to control, e.g., a light in a room, or any other device that may be desire to control in response to detected motion (e.g., a camera), Although the disclosed inventions are illustrated and described herein as embodied in one or more specific examples, it is nevertheless not intended to be limited to the details shown, since various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

What is claimed is:

1. A motion sensing method comprising:
monitoring for a first motion in a first region using a first antenna using a first motion detection parameter, wherein the first motion detection parameter causes at least one of the first antenna to transmit radio frequency (RF) energy at a first power or the first motion to be sensed using a first trigger level;

determining that no first motion is sensed by the monitoring using the first antenna, and, in response, monitoring for a second motion in a second region using a second antenna using a second motion detection parameter, wherein the second motion detection parameter, causes at least one of the second antenna to transmit RF energy at a second power, and the second power is greater than the first power or the second motion to be sensed using a second trigger level, wherein the first trigger level is higher than the second trigger level; and determining that no second motion is sensed by monitoring using the second antenna, and, in response, designating a space, which encompasses the second region, as unoccupied, wherein the first region and the second region overlap one another, the first region encompasses the second region, and the first motion detection parameter is different from the second motion detection parameter.

2. The method of claim 1, wherein a beam width of the first antenna is wider than a beam width of the second antenna.

3. The method of claim 1, further comprising changing an operation status of an apparatus associated with the space when no first motion is sensed and no second motion is sensed.

4. The method of claim 3, wherein the apparatus is a light, and the light is turned off when no first motion is sensed and no second motion is sensed.

5. The method of claim 3, further comprising again monitoring for the second motion in the second region using the second antenna, and when the second motion is sensed by monitoring using the second antenna, designating the space, which encompasses the second region, as occupied.

6. The method of claim 5, wherein the light is turned on when the second motion is sensed.

7. A motion sensing method employing a first antenna and a second antenna, the method comprising:

monitoring for a first motion in a first region using the first antenna using a first motion detection parameter;

determining that no first motion is sensed by the monitoring using the first antenna, and, in response, monitoring for a second motion in a second region using the second antenna using a second motion detection parameter;

determining that no second motion is sensed by monitoring using the second antenna, and, in response, monitoring for a third motion in the first region using the first antenna using a third motion detection parameter; and determining that no third motion is sensed by monitoring using the first antenna using the third motion detection parameter, and, in response, designating a space, which encompasses the first region, as unoccupied, wherein a beam width of the second antenna is wider than a beam width of the first antenna, the first region and the second region overlap one another, the first motion detection parameter is different from the third motion detection parameter, and the second motion detection parameter is different from the third motion detection parameter.

8. The method of claim 7, wherein the first motion detection parameter is configured to cause the first antenna to transmit radio frequency (RF) energy at a first power and the third motion detection parameter is configured to cause the first antenna to transmit RF energy at a second power, wherein the second power is higher than the first power.

9. The method of claim 7, wherein the first motion detection parameter is configured to cause the first motion to be sensed using a first trigger level, and the third motion detection parameter is configured to cause the third motion to be sensed using a second trigger level, wherein the first trigger level is higher than the second trigger level.

10. The method of claim 7, wherein first motion is larger than the third motion.

11. The method of claim 7, further comprising changing an operation status of an apparatus associated with the space when no first motion is sensed, no second motion is sensed, and no third motion is sensed.

12. The method of claim 11, further comprising again monitoring for the first motion in the first region using the first antenna, and when the first motion is sensed by monitoring using the first antenna, designating the space, which encompasses the first region, as occupied.

13. The method of claim 12, wherein the apparatus is a light, and the light is turned on when the first motion is sensed.

* * * * *